(12) United States Patent
Bertuccio et al.

(10) Patent No.: US 12,475,946 B2
(45) Date of Patent: Nov. 18, 2025

(54) MEMORY DEVICES WITH A LOWER EFFECTIVE PROGRAM VERIFY LEVEL

(71) Applicant: MICRON TECHNOLOGY, INC., Boise, ID (US)

(72) Inventors: Massimo Ernesto Bertuccio, San Donato Milanese (IT); Sead Zildzic, Jr., Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 187 days.

(21) Appl. No.: 18/234,429

(22) Filed: Aug. 16, 2023

(65) Prior Publication Data

US 2024/0071484 A1    Feb. 29, 2024

Related U.S. Application Data

(60) Provisional application No. 63/402,497, filed on Aug. 31, 2022.

(51) Int. Cl.
*G11C 16/04* (2006.01)
*G11C 11/56* (2006.01)
*G11C 16/10* (2006.01)

(52) U.S. Cl.
CPC ...... *G11C 11/5628* (2013.01); *G11C 11/5671* (2013.01); *G11C 16/0483* (2013.01); *G11C 16/10* (2013.01)

(58) Field of Classification Search
CPC ............ G11C 11/5628; G11C 11/5671; G11C 16/0483; G11C 16/10; G11C 2211/5621; G11C 11/5642; G11C 16/08; G11C 16/32
USPC ...................................... 365/185.03
See application file for complete search history.

(56) References Cited

U.S. PATENT DOCUMENTS 9,530,517 B2 * 12/2016 Lee .................. G11C 16/14
10,839,927 B1 * 11/2020 Cantarelli .......... G11C 16/0483

* cited by examiner

*Primary Examiner* — Tha-O H Bui
(74) *Attorney, Agent, or Firm* — Dicke, Billig & Czaja, PLLC

(57) ABSTRACT

A memory device includes an array of memory cells, a plurality of access lines, and a controller. The array of memory cells includes a plurality of strings of series-connected memory cells. The controller is configured to access the array of memory cells to program a selected memory cell of the array of memory cells to a first target level. The controller is further configured to apply a first voltage level to a first access line connected to the selected memory cell, and apply a second voltage level higher than the first voltage level to a second access line adjacent to the first access line, apply a third voltage level between the first voltage level and the second voltage level to a third access line adjacent to the first access line and connected to an erased memory cell, and sense a first threshold voltage of the selected memory cell.

20 Claims, 21 Drawing Sheets

MEMORY DEVICES WITH A LOWER EFFECTIVE PROGRAM VERIFY LEVEL

RELATED APPLICATION

This application claims the benefit of U.S. Provisional Application No. 63/402,497, filed on Aug. 31, 2022, hereby incorporated herein in its entirety by reference.

TECHNICAL FIELD

The present disclosure relates generally to memory and, in particular, in one or more embodiments, the present disclosure relates to lowering a program verify voltage level below the minimum negative voltage source available within a memory device.

BACKGROUND

Memories (e.g., memory devices) are typically provided as internal, semiconductor, integrated circuit devices in computers or other electronic devices. There are many different types of memory including random-access memory (RAM), read only memory (ROM), dynamic random access memory (DRAM), synchronous dynamic random access memory (SDRAM), and flash memory.

Flash memory has developed into a popular source of non-volatile memory for a wide range of electronic applications. Flash memory typically use a one-transistor memory cell that allows for high memory densities, high reliability, and low power consumption. Changes in threshold voltage (Vt) of the memory cells, through programming (which is often referred to as writing) of charge storage structures (e.g., floating gates or charge traps) or other physical phenomena (e.g., phase change or polarization), determine the data state (e.g., data value) of each memory cell. Common uses for flash memory and other non-volatile memory include personal computers, personal digital assistants (PDAs), digital cameras, digital media players, digital recorders, games, appliances, vehicles, wireless devices, mobile telephones, and removable memory modules, and the uses for non-volatile memory continue to expand.

A NAND flash memory is a common type of flash memory device, so called for the logical form in which the basic memory cell configuration is arranged. Typically, the array of memory cells for NAND flash memory is arranged such that the control gate of each memory cell of a row of the array is connected together to form an access line, such as a word line. Columns of the array include strings (often termed NAND strings) of memory cells connected together in series between a pair of select gates, e.g., a source select transistor and a drain select transistor. Each source select transistor may be connected to a source, while each drain select transistor may be connected to a data line, such as column bit line. Variations using more than one select gate between a string of memory cells and the source, and/or between the string of memory cells and the data line, are known.

In programming memory, memory cells may generally be programmed as what are often termed single-level cells (SLC) or multiple-level cells (MLC). SLC may use a single memory cell to represent one digit (e.g., bit) of data. For example, in SLC, a Vt of 2.5V might indicate a programmed memory cell (e.g., representing a logical 0) while a Vt of −0.5V might indicate an erased cell (e.g., representing a logical 1). As an example, the erased state in SLC might be represented by any threshold voltage less than or equal to 0V, while the programmed data state might be represented by any threshold voltage greater than 0V.

MLC uses more than two Vt ranges, where each Vt range indicates a different data state. As is generally known, a margin (e.g., a certain number of volts), such as a dead space, may separate adjacent Vt ranges, e.g., to facilitate differentiating between data states. Multiple-level cells can take advantage of the analog nature of traditional non-volatile memory cells by assigning a bit pattern to a specific Vt range. While MLC typically uses a memory cell to represent one data state of a binary number of data states (e.g., 4, 8, 16, . . . ), a memory cell operated as MLC may be used to represent a non-binary number of data states. For example, where the MLC uses three Vt ranges, two memory cells might be used to collectively represent one of eight data states.

In programming MLC memory, data values are often programmed using more than one pass, e.g., programming one or more digits in each pass. For example, in four-level MLC (typically referred to simply as MLC), a first digit, e.g., a least significant bit (LSB), often referred to as lower page (LP) data, may be programmed to the memory cells in a first pass, thus resulting in two (e.g., first and second) threshold voltage ranges. Subsequently, a second digit, e.g., a most significant bit (MSB), often referred to as upper page (UP) data may be programmed to the memory cells in a second pass, typically moving some portion of those memory cells in the first threshold voltage range into a third threshold voltage range, and moving some portion of those memory cells in the second threshold voltage range into a fourth threshold voltage range. Similarly, eight-level MLC (typically referred to as TLC) may represent a bit pattern of three bits, including a first digit, e.g., a least significant bit (LSB) or lower page (LP) data; a second digit, e.g., upper page (UP) data; and a third digit, e.g., a most significant bit (MSB) or extra page (XP) data. In operating TLC, the LP data may be programmed to the memory cells in a first pass, resulting in two threshold voltage ranges, followed by the UP data and the XP data in a second pass, resulting in eight threshold voltage ranges. Similarly, sixteen-level MLC (typically referred to as QLC) may represent a bit pattern of four bits, and 32-level MLC (typically referred to as PLC) may represent a bit pattern of five bits.

A read window, which may be referred to as a read window width, refers to a distance (e.g., in voltage) between adjacent Vt distributions at a particular bit error rate (BER). A read window budget (RWB) may refer to a cumulative value of read windows for a group of programmed cells (e.g., one or more pages of cells). For example, TLC memory cells configured to store three bits of data per cell may be programmed to one of eight different Vt distributions, each corresponding to a respective data state. In this example, the RWB may be the cumulative value (e.g., in voltage) of the seven read windows between the eight Vt distributions.

DETAILED DESCRIPTION

Figure 1:
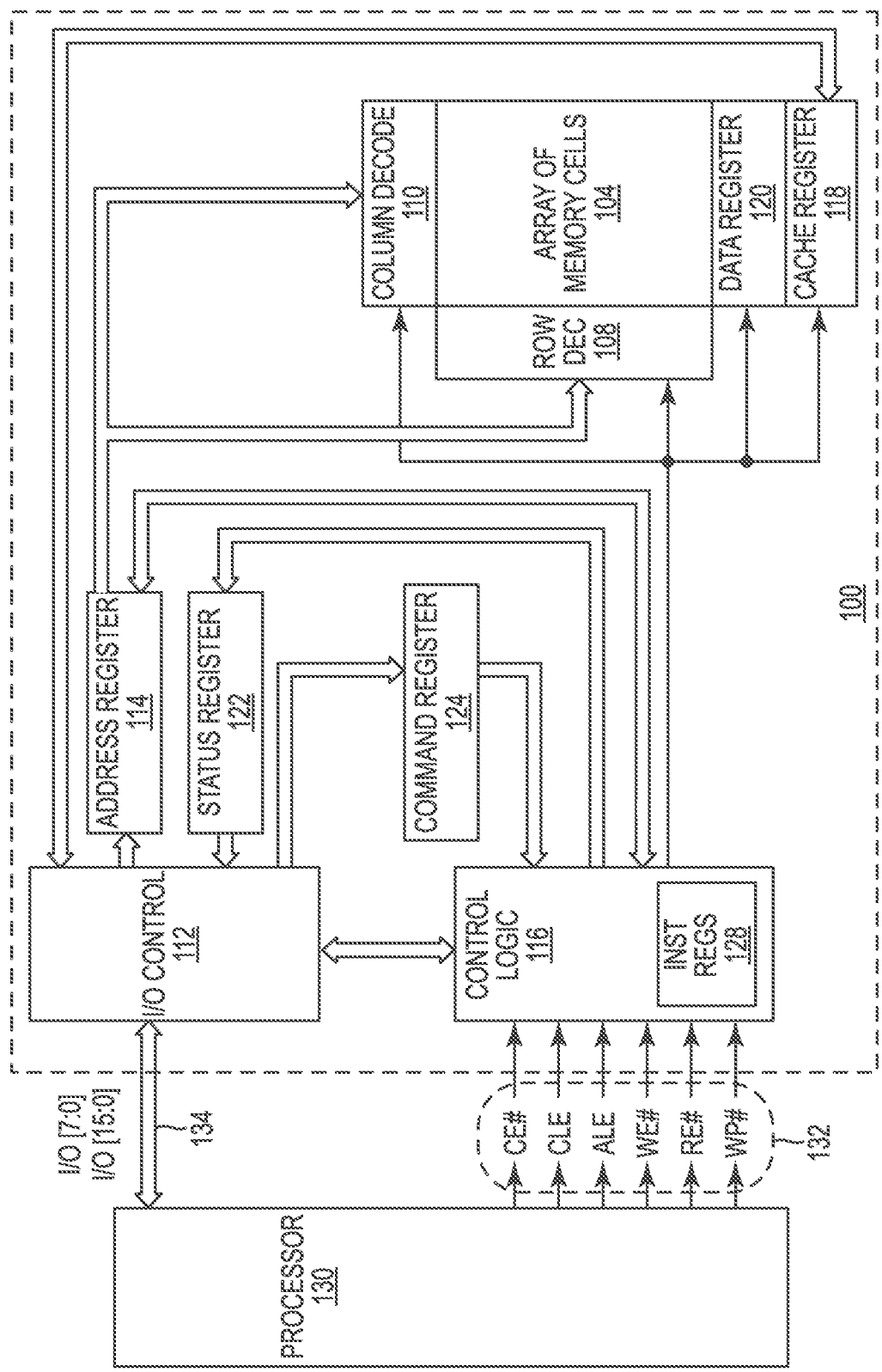
FIG. 1 is a simplified block diagram of a memory in communication with a processor as part of an electronic system, according to an embodiment.

In the following detailed description, reference is made to the accompanying drawings that form a part hereof, and in which is shown, by way of illustration, specific embodiments. In the drawings, like reference numerals describe substantially similar components throughout the several views. Other embodiments may be utilized and structural, logical and electrical changes may be made without departing from the scope of the present disclosure. The following detailed description is, therefore, not to be taken in a limiting sense.

The term "semiconductor" used herein can refer to, for example, a layer of material, a wafer, or a substrate, and includes any base semiconductor structure. "Semiconductor" is to be understood as including silicon-on-sapphire (SOS) technology, silicon-on-insulator (SOI) technology, thin film transistor (TFT) technology, doped and undoped semiconductors, epitaxial layers of a silicon supported by a base semiconductor structure, as well as other semiconductor structures well known to one skilled in the art. Furthermore, when reference is made to a semiconductor in the following description, previous process steps might have been utilized to form regions/junctions in the base semiconductor structure, and the term semiconductor can include the underlying layers containing such regions/junctions.

The term "conductive" as used herein, as well as its various related forms, e.g., conduct, conductively, conducting, conduction, conductivity, etc., refers to electrically conductive unless otherwise apparent from the context. Similarly, the term "connecting" as used herein, as well as its various related forms, e.g., connect, connected, connection, etc., refers to electrically connecting unless otherwise apparent from the context.

Ranges might be expressed herein as from "about" one particular value, and/or to "about" another particular value. When such a range is expressed, another embodiment might include from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

It is recognized herein that even where values might be intended to be equal, variabilities and accuracies of industrial processing and operation might lead to differences from their intended values. These variabilities and accuracies will generally be dependent upon the technology utilized in fabrication and operation of the integrated circuit device. As such, if values are intended to be equal, those values are deemed to be equal regardless of their resulting values.

As will be described in more detail below with reference to FIGS. 3-7, in programming MLC memory, data values may be programmed using a coarse programming pass (with lower corresponding program verify levels) of a multiple pass programing operation followed by a fine programming pass (with higher corresponding program verify levels) of the multiple pass programming operation. In the coarse programming pass, the memory cells may be programmed to coarse (e.g., broader) target levels (e.g., threshold voltages). In the fine programming pass, the memory cells may be programmed to fine (e.g., narrower) target levels, which may be the final target levels for the memory cells. The target levels may include an erased L0 level and any number of programmed levels L1, L2, etc. For example, the target levels for QLC memory may include 16 target levels L0 to L15. With a first page of memory cells (e.g., memory cells connected to a common first word line) programmed to their coarse target levels, an adjacent second page of memory cells (e.g., memory cells connected to a common second word line), which is currently erased, may be programmed to their coarse target levels. Next, the first page of memory cells may be programmed to their fine target levels. A third page of memory cells (e.g., memory cells connected to a common third word line), which is currently erased, adjacent to the second page of memory cells may then be programmed to their coarse target levels. With the third page of memory cells programmed to their coarse target levels, the second page of memory cells may be programmed to their fine target levels and the programming process may continue until all desired pages of the selected memory block have been programmed to their fine target levels. The coarse programming pass followed by the fine programming pass as described above compensates for word line-to-word line interference (e.g., cell-to-cell coupling) in the vertical direction of a three-dimensional NAND memory array.

Data retention of a NAND memory array (e.g., a three-dimensional NAND memory array) strongly depends on the electric field in the memory cell. Hence, data retention depends on the difference between the programmed threshold voltage Vt of the memory cell and the ultraviolet threshold voltage UVVt (e.g., natural threshold voltage) of the memory cell. Tier-pitch scaling (e.g., arranging the tiers [e.g., word line and memory cell layers] closer together) within three-dimensional NAND memory lowers the UVVt due to the short-channel effect, and no effective process to raise the UVVt back up is known. Therefore, the operating window should be shifted down with tier-pitch scaling to avoid excessive degradation of data retention. Shifting down the operating window may be achieved by extending the negative capability of read voltages for each technology node. In each technology node, the negative capability of read voltages for QLC might be more beneficial than for TLC because of the larger window for QLC. In any case, the most beneficial trim might be the coarse program verify for level L1 ($PV1_C$). With tier-pitch scaling, not only should the fine program verify for level L1 ($PV1_F$) shift down because of data retention, but $PV1_C$ should be shifted down even more. Because of the degradation of cell-to-cell (C2C) interference, a larger program verify offset might be used between the coarse program verify and the fine program verify. The program verify operations disclosed herein enable a negative read voltage of NAND memory (e.g., QLC NAND memory) less than the minimum negative voltage source available within the NAND memory by lowering the effective $PV1_C$ by 500-700 mV, for example, depending upon the characteristics of the memory cell.

This disclosure leverages word line-to-cell (WL2C) coupling to shift down the effective $PV1_C$ during a program verify operation by lowering a pass voltage $VPASS_{1R}$ applied to the unselected word line adjacent to the selected word line (e.g., drain-side word line connected to an L0 erased memory cell), while a higher pass voltage $VPASS_R$ is applied to the other unselected word lines. The $VPASS_{1R}$ voltage level is limited by the overdrive of L0 erased cells connected to the adjacent word line. In some examples, voltage levels as low as about 2V may safely be used for $VPASS_{1R}$. For example, with a 10% WL2C coupling, an about −5V $VPASS_{1R}$ reduction from $VPASS_R$ would effectively shift down $PV1_C$ by about 500 mV.

The $PV1_C$ shift depends on the cell revision and technology node, since the effective $PV1_C$ is a function of WL2C. This is not a serious limitation, however, since a lower effective $PV1_C$ is required in the case of larger C2C, which is typically correlated with a larger WL2C, as both mechanisms are related to the WL-to-channel control. Therefore, for a given $VPASS_{1R}$ reduction from $VPASS_R$, the $PV1_C$ shift is larger in cell revisions or technology nodes actually requiring a lower effective $PV1_C$.

$VPASS_{1R}$ might be provided by a dedicated, trimmable, voltage source. The voltage source might have a range between 0V and about 7V with about 100 mV resolution. If a dedicated voltage source is not available or is cost prohibitive, $V_{CC}$ could be used to apply a fixed 500-700 mV shift. Contrary to using a dedicated voltage source ranging from 0V to about 7V, using $V_{CC}$ might limit the maximum $PV1_C$ shift to about $(VPASS_{1R}-V_{CC})*WL2C$. To overcome this limitation, GND could be used instead of $V_{CC}$. GND might work for very negative windows, with an erased distribution significantly below −2V. For this reason, the GND option might be used in combination with $V_{CC}$, and a 2-bit trim may be used to select among $V_{CC}$, GND, and neither $V_{CC}$ nor GND. If either $V_{CC}$ or GND is used, a dedicated program verify offset for level L1 might be used, since the program verify offset is typically shared between L1 and L2 in QLC memory arrays, conflicting with a shift applied solely to $PV1_C$. A trim value may be added to the memory device to enable or disable the shift in $PV1_C$ to push the effective $PV1_C$ lower than the minimum negative read voltage.

$VPASS_{1R}$ may be significantly lower than $VPASS_R$ during a coarse program verify operation for level L1, since the adjacent access line is erased during the first program pass. For example, with a WL2C of about 12.5%, lowering the $VPASS_{1R}$ of the adjacent access line from 6.5V to 2.5V saves about 500 mV of negative voltage. That is, the same Vt placement can be achieved with a program verify voltage level 500 mV higher. The program verify process disclosed herein might scale well to future nodes, since the shift depends on WL2C, so the more scaled the tier pitch, the larger the shift. As for the cell-by-cell variability of WL2C, a small widening of the L1 distribution after the coarse programming step may be observed. This, however, is irrelevant because the coarse state is not read in QLC, and no degradation can be measured in L1 after fine programming.

While the following description discloses the use of $VPASS_{1R}$ during a coarse program verify operation for level L1, in other embodiments, $VPASS_{1R}$ may also be used during a coarse program verify operation for higher levels (e.g., L2, L3, etc.).

FIG. 1 is a simplified block diagram of a first apparatus, in the form of a memory (e.g., memory device) 100, in communication with a second apparatus, in the form of a processor 130, as part of a third apparatus, in the form of an electronic system, according to an embodiment. Some examples of electronic systems include personal computers, personal digital assistants (PDAs), digital cameras, digital media players, digital recorders, games, appliances, vehicles, wireless devices, mobile telephones and the like. The processor 130, e.g., a controller external to the memory device 100, might be a memory controller or other external host device.

Memory device 100 includes an array of memory cells 104 that might be logically arranged in rows and columns. Memory cells of a logical row are typically connected to the same access line (commonly referred to as a word line) while memory cells of a logical column are typically selectively connected to the same data line (commonly referred to as a bit line). A single access line might be associated with more than one logical row of memory cells and a single data line might be associated with more than one logical column. Memory cells (not shown in FIG. 1) of at least a portion of array of memory cells 104 are capable of being programmed to one of at least two target data states.

A row decode circuitry 108 and a column decode circuitry 110 are provided to decode address signals. Address signals are received and decoded to access the array of memory cells 104. Memory device 100 also includes input/output (I/O) control circuitry 112 to manage input of commands, addresses and data to the memory device 100 as well as output of data and status information from the memory device 100. An address register 114 is in communication with I/O control circuitry 112 and row decode circuitry 108 and column decode circuitry 110 to latch the address signals prior to decoding. A command register 124 is in communication with I/O control circuitry 112 and control logic 116 to latch incoming commands.

A controller (e.g., the control logic 116 internal to the memory device 100) controls access to the array of memory cells 104 in response to the commands and may generate status information for the external processor 130, i.e., control logic 116 is configured to perform access operations (e.g., sensing operations [which might include read operations and verify operations], programming operations and/or erase operations) on the array of memory cells 104. The control logic 116 is in communication with row decode circuitry 108 and column decode circuitry 110 to control the row decode circuitry 108 and column decode circuitry 110 in response to the addresses. The control logic 116 might include instruction registers 128 which might represent computer-usable memory for storing computer-readable instructions. For some embodiments, the instruction registers 128 might represent firmware. Alternatively, the instruction registers 128 might represent a grouping of memory cells, e.g., reserved block(s) of memory cells, of the array of memory cells 104.

Control logic 116 might also be in communication with a cache register 118. Cache register 118 latches data, either incoming or outgoing, as directed by control logic 116 to temporarily store data while the array of memory cells 104 is busy writing or reading, respectively, other data. During a programming operation (e.g., write operation), data might be passed from the cache register 118 to the data register 120 for transfer to the array of memory cells 104; then new data might be latched in the cache register 118 from the I/O control circuitry 112. During a read operation, data might be passed from the cache register 118 to the I/O control circuitry 112 for output to the external processor 130; then new data might be passed from the data register 120 to the cache register 118. The cache register 118 and/or the data register 120 might form (e.g., might form a portion of) a page buffer of the memory device 100. A page buffer might further include sensing devices (not shown in FIG. 1) to sense a data state of a memory cell of the array of memory cells 104, e.g., by sensing a state of a data line connected to that memory cell. A status register 122 might be in communication with I/O control circuitry 112 and control logic 116 to latch the status information for output to the processor 130.

Memory device 100 receives control signals at control logic 116 from processor 130 over a control link 132. The control signals might include a chip enable CE #, a command latch enable CLE, an address latch enable ALE, a write enable WE #, a read enable RE #, and a write protect WP #. Additional or alternative control signals (not shown) might be further received over control link 132 depending upon the nature of the memory device 100. Memory device 100 receives command signals (which represent commands), address signals (which represent addresses), and data signals (which represent data) from processor 130 over a multiplexed input/output (I/O) bus 134 and outputs data to processor 130 over I/O bus 134.

For example, the commands might be received over input/output (I/O) pins [7:0] of I/O bus 134 at I/O control circuitry 112 and might then be written into command register 124. The addresses might be received over input/output (I/O) pins [7:0] of I/O bus 134 at I/O control circuitry 112 and might then be written into address register 114. The data might be received over input/output (I/O) pins [7:0] for an 8-bit device or input/output (I/O) pins [15:0] for a 16-bit device at I/O control circuitry 112 and then might be written into cache register 118. The data might be subsequently written into data register 120 for programming the array of memory cells 104. For another embodiment, cache register 118 might be omitted, and the data might be written directly into data register 120. Data might also be output over input/output (I/O) pins [7:0] for an 8-bit device or input/output (I/O) pins [15:0] for a 16-bit device. Although reference might be made to I/O pins, they might include any conductive nodes providing for electrical connection to the memory device 100 by an external device (e.g., processor 130), such as conductive pads or conductive bumps as are commonly used.

It will be appreciated by those skilled in the art that additional circuitry and signals can be provided, and that the memory device 100 of FIG. 1 has been simplified. It should be recognized that the functionality of the various block components described with reference to FIG. 1 might not necessarily be segregated to distinct components or component portions of an integrated circuit device. For example, a single component or component portion of an integrated circuit device could be adapted to perform the functionality of more than one block component of FIG. 1. Alternatively, one or more components or component portions of an integrated circuit device could be combined to perform the functionality of a single block component of FIG. 1.

Additionally, while specific I/O pins are described in accordance with popular conventions for receipt and output of the various signals, it is noted that other combinations or numbers of I/O pins (or other I/O node structures) might be used in the various embodiments.

Figure 2A:
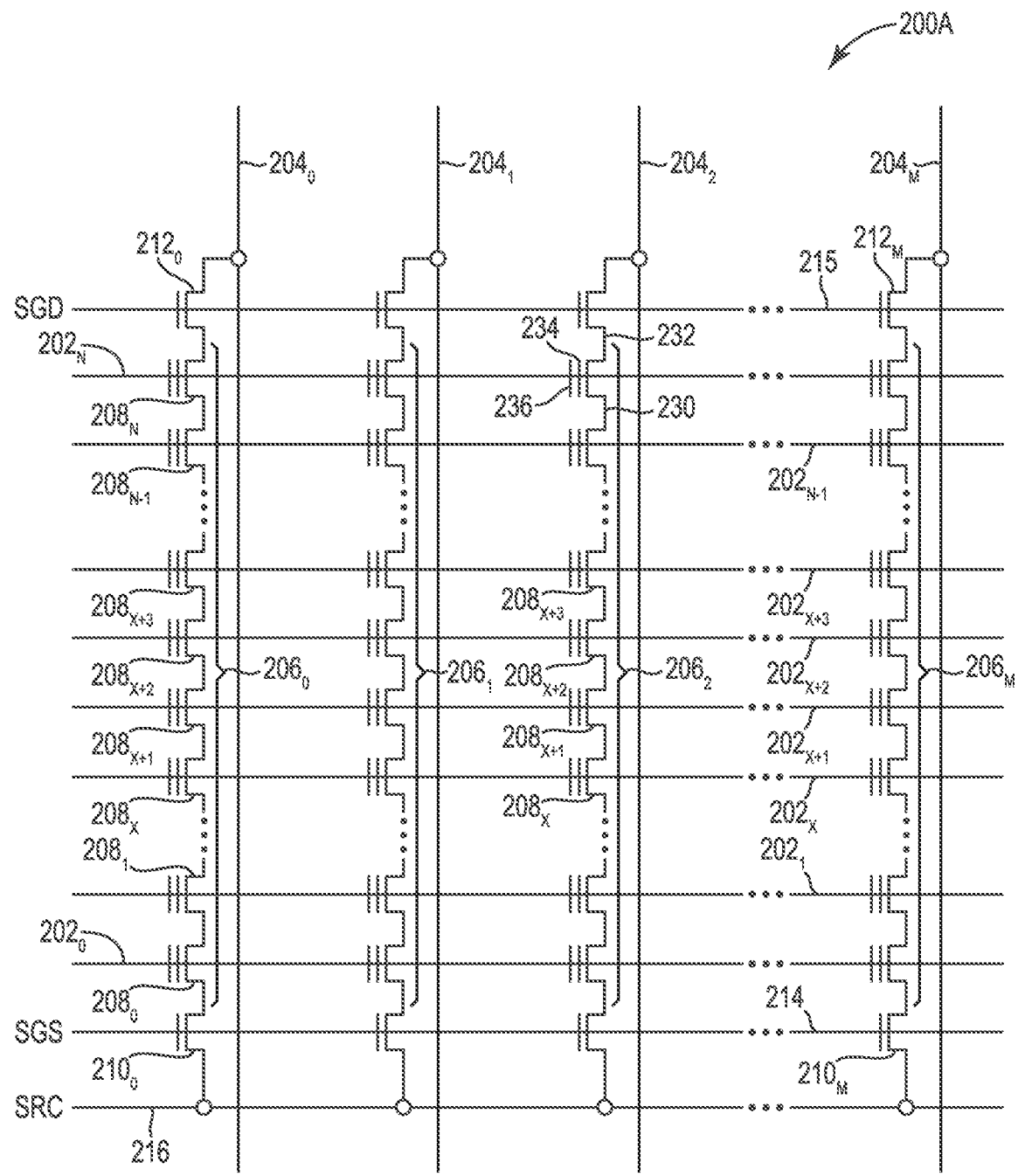
FIGS. 2A-2C are schematics of portions of an array of memory cells as could be used in a memory of the type described with reference to FIG. 1.

FIG. 2A is a schematic of a portion of an array of memory cells 200A, such as a NAND memory array, as could be used in a memory of the type described with reference to FIG. 1, e.g., as a portion of array of memory cells 104. Memory array 200A includes access lines (e.g., word lines) $202_0$ to $202_N$, and data lines (e.g., bit lines) $204_0$ to $204_M$. The access lines 202 might be connected to global access lines (e.g., global word lines), not shown in FIG. 2A, in a many-to-one relationship. For some embodiments, memory array 200A might be formed over a semiconductor that, for example, might be conductively doped to have a conductivity type, such as a p-type conductivity, e.g., to form a p-well, or an n-type conductivity, e.g., to form an n-well.

Memory array 200A might be arranged in rows (each corresponding to an access line 202) and columns (each corresponding to a data line 204). Each column might include a string of series-connected memory cells (e.g., non-volatile memory cells), such as one of NAND strings $206_0$ to $206_M$. Each NAND string 206 might be connected (e.g., selectively connected) to a common source (SRC) 216 and might include memory cells $208_0$ to $208_N$. The memory cells 208 might represent non-volatile memory cells for storage of data. The memory cells $208_0$ to $208_N$ might include memory cells intended for storage of data, and might further include other memory cells not intended for storage of data, e.g., dummy memory cells. Dummy memory cells are typically not accessible to a user of the memory, and are instead typically incorporated into the string of series-connected memory cells for operational advantages that are well understood.

The memory cells 208 of each NAND string 206 might be connected in series between a select gate 210 (e.g., a field-effect transistor), such as one of the select gates $210_0$ to $210_M$ (e.g., that might be source select transistors, commonly referred to as select gate source), and a select gate 212 (e.g., a field-effect transistor), such as one of the select gates $212_0$ to $212_M$ (e.g., that might be drain select transistors, commonly referred to as select gate drain). Select gates $210_0$ to $210_M$ might be commonly connected to a select line 214, such as a source select line (SGS), and select gates $212_0$ to $212_M$ might be commonly connected to a select line 215, such as a drain select line (SGD). Although depicted as traditional field-effect transistors, the select gates 210 and 212 might utilize a structure similar to (e.g., the same as) the memory cells 208. The select gates 210 and 212 might represent a plurality of select gates connected in series, with each select gate in series configured to receive a same or independent control signal.

A source of each select gate 210 might be connected to common source 216. The drain of each select gate 210 might be connected to a memory cell $208_0$ of the corresponding NAND string 206. For example, the drain of select gate $210_0$ might be connected to memory cell $208_0$ of the corresponding NAND string $206_0$. Therefore, each select gate 210 might be configured to selectively connect a corresponding NAND string 206 to common source 216. A control gate of each select gate 210 might be connected to select line 214.

The drain of each select gate 212 might be connected to the data line 204 for the corresponding NAND string 206. For example, the drain of select gate $212_0$ might be connected to the data line $204_0$ for the corresponding NAND string $206_0$. The source of each select gate 212 might be connected to a memory cell $208_N$ of the corresponding NAND string 206. For example, the source of select gate $212_0$ might be connected to memory cell $208_N$ of the corresponding NAND string $206_0$. Therefore, each select gate 212 might be configured to selectively connect a corresponding NAND string 206 to the corresponding data line 204. A control gate of each select gate 212 might be connected to select line 215.

The memory array in FIG. 2A might be a quasi-two-dimensional memory array and might have a generally planar structure, e.g., where the common source 216, NAND strings 206 and data lines 204 extend in substantially parallel planes. Alternatively, the memory array in FIG. 2A might be a three-dimensional memory array, e.g., where NAND strings 206 might extend substantially perpendicular to a plane containing the common source 216 and to a plane containing the data lines 204 that might be substantially parallel to the plane containing the common source 216.

Typical construction of memory cells 208 includes a data-storage structure 234 (e.g., a floating gate, charge trap, or other structure configured to store charge) that can determine a data state of the memory cell (e.g., through changes in threshold voltage), and a control gate 236, as shown in FIG. 2A. The data-storage structure 234 might include both conductive and dielectric structures while the control gate 236 is generally formed of one or more conductive materials. In some cases, memory cells 208 might further have a defined source/drain (e.g., source) 230 and a defined source/drain (e.g., drain) 232. Memory cells 208 have their control gates 236 connected to (and in some cases form) an access line 202.

A column of the memory cells 208 might be a NAND string 206 or a plurality of NAND strings 206 selectively connected to a given data line 204. A row of the memory cells 208 might be memory cells 208 commonly connected to a given access line 202. A row of memory cells 208 can, but need not, include all memory cells 208 commonly connected to a given access line 202. Rows of memory cells 208 might often be divided into one or more groups of physical pages of memory cells 208, and physical pages of memory cells 208 often include every other memory cell 208 commonly connected to a given access line 202. For example, memory cells 208 commonly connected to access line $202_N$ and selectively connected to even data lines 204 (e.g., data lines $204_0$, $204_2$, $204_4$, etc.) might be one physical page of memory cells 208 (e.g., even memory cells) while memory cells 208 commonly connected to access line $202_N$ and selectively connected to odd data lines 204 (e.g., data lines $204_1$, $204_3$, $204_5$, etc.) might be another physical page of memory cells 208 (e.g., odd memory cells). Although data lines $204_3$-$204_5$ are not explicitly depicted in FIG. 2A, it is apparent from the figure that the data lines 204 of the array of memory cells 200A might be numbered consecutively from data line $204_0$ to data line $204_M$. Other groupings of memory cells 208 commonly connected to a given access line 202 might also define a physical page of memory cells 208. For certain memory devices, all memory cells commonly connected to a given access line might be deemed a physical page of memory cells. The portion of a physical page of memory cells (which, in some embodiments, could still be the entire row) that is read during a single read operation or programmed during a single programming operation (e.g., an upper or lower page of memory cells) might be deemed a logical page of memory cells. A block of memory cells might include those memory cells that are configured to be erased together, such as all memory cells connected to access lines $202_0$-$202_N$ (e.g., all NAND strings 206 sharing common access lines 202). Unless expressly distinguished, a reference to a page of memory cells herein refers to the memory cells of a logical page of memory cells.

Although the example of FIG. 2A is discussed in conjunction with NAND flash, the embodiments and concepts described herein are not limited to a particular array architecture or structure, and can include other structures (e.g., SONOS or other data storage structure configured to store charge) and other architectures (e.g., AND arrays, NOR arrays, etc.).

Figure 2B:
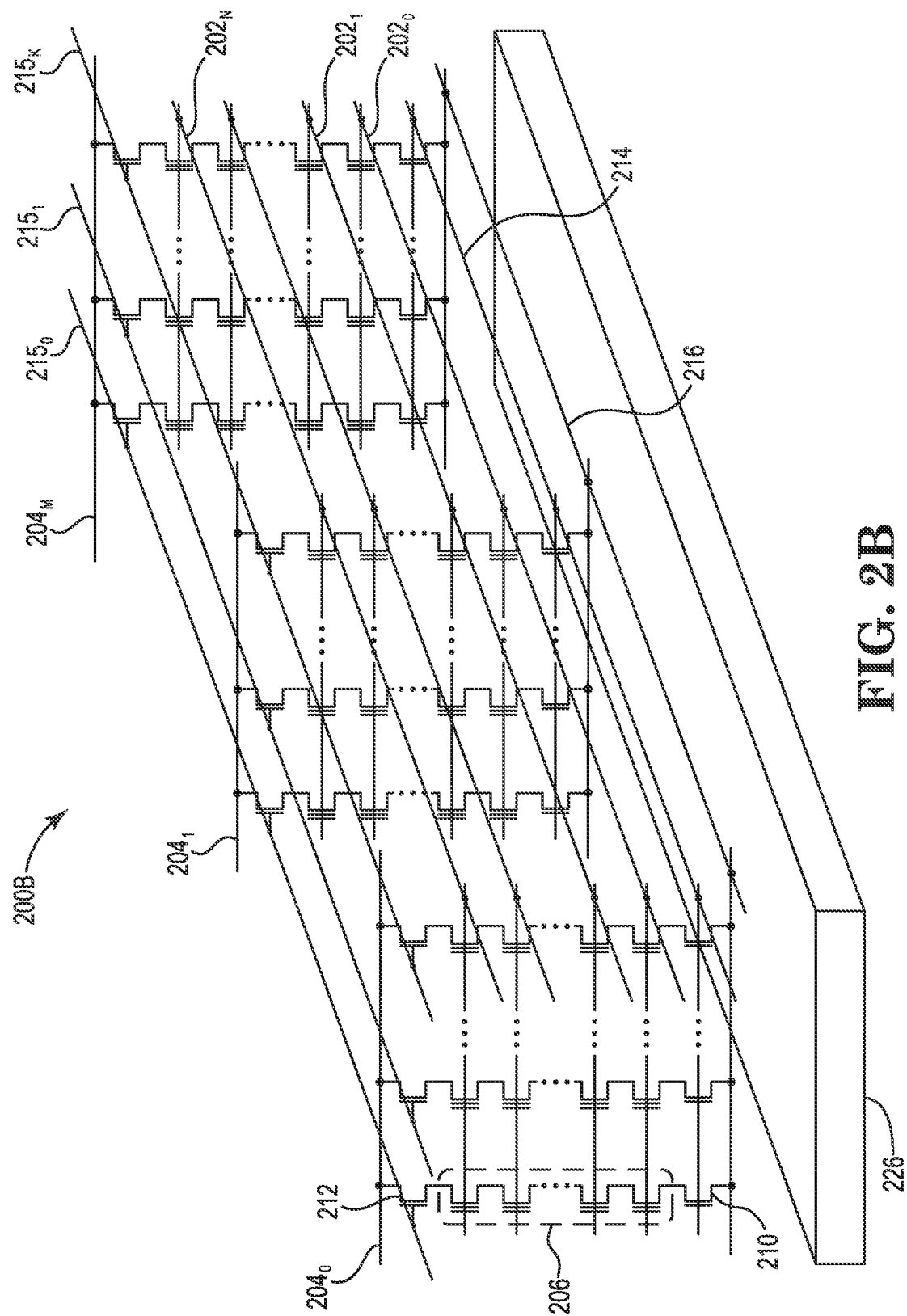

FIG. 2B is another schematic of a portion of an array of memory cells 200B as could be used in a memory of the type described with reference to FIG. 1, e.g., as a portion of array of memory cells 104. Like numbered elements in FIG. 2B correspond to the description as provided with respect to FIG. 2A. FIG. 2B provides additional detail of one example of a three-dimensional NAND memory array structure. The three-dimensional NAND memory array 200B might incorporate vertical structures which might include semiconductor pillars where a portion of a pillar might act as a channel region of the memory cells of NAND strings 206. The NAND strings 206 might be each selectively connected to a data line $204_0$ to $204_M$ by a select transistor 212 (e.g., that might be drain select transistors, commonly referred to as select gate drain) and to a common source 216 by a select transistor 210 (e.g., that might be source select transistors, commonly referred to as select gate source). Multiple NAND strings 206 might be selectively connected to the same data line 204. Subsets of NAND strings 206 can be connected to their respective data lines 204 by biasing the select lines $215_0$ to $215_K$ to selectively activate particular select transistors 212 each between a NAND string 206 and a data line 204. The select transistors 210 can be activated by biasing the select line 214. Each access line 202 might be connected to multiple rows of memory cells of the memory array 200B. Rows of memory cells that are commonly connected to each other by a particular access line 202 might collectively be referred to as tiers.

The three-dimensional NAND memory array 200B might be formed over peripheral circuitry 226. The peripheral circuitry 226 might represent a variety of circuitry for accessing the memory array 200B. The peripheral circuitry 226 might include complementary circuit elements. For example, the peripheral circuitry 226 might include both n-channel and p-channel transistors formed on a same semiconductor substrate, a process commonly referred to as CMOS, or complementary metal-oxide-semiconductors. Although CMOS often no longer utilizes a strict metal-oxide-semiconductor construction due to advancements in integrated circuit fabrication and design, the CMOS designation remains as a matter of convenience.

Figure 2C:
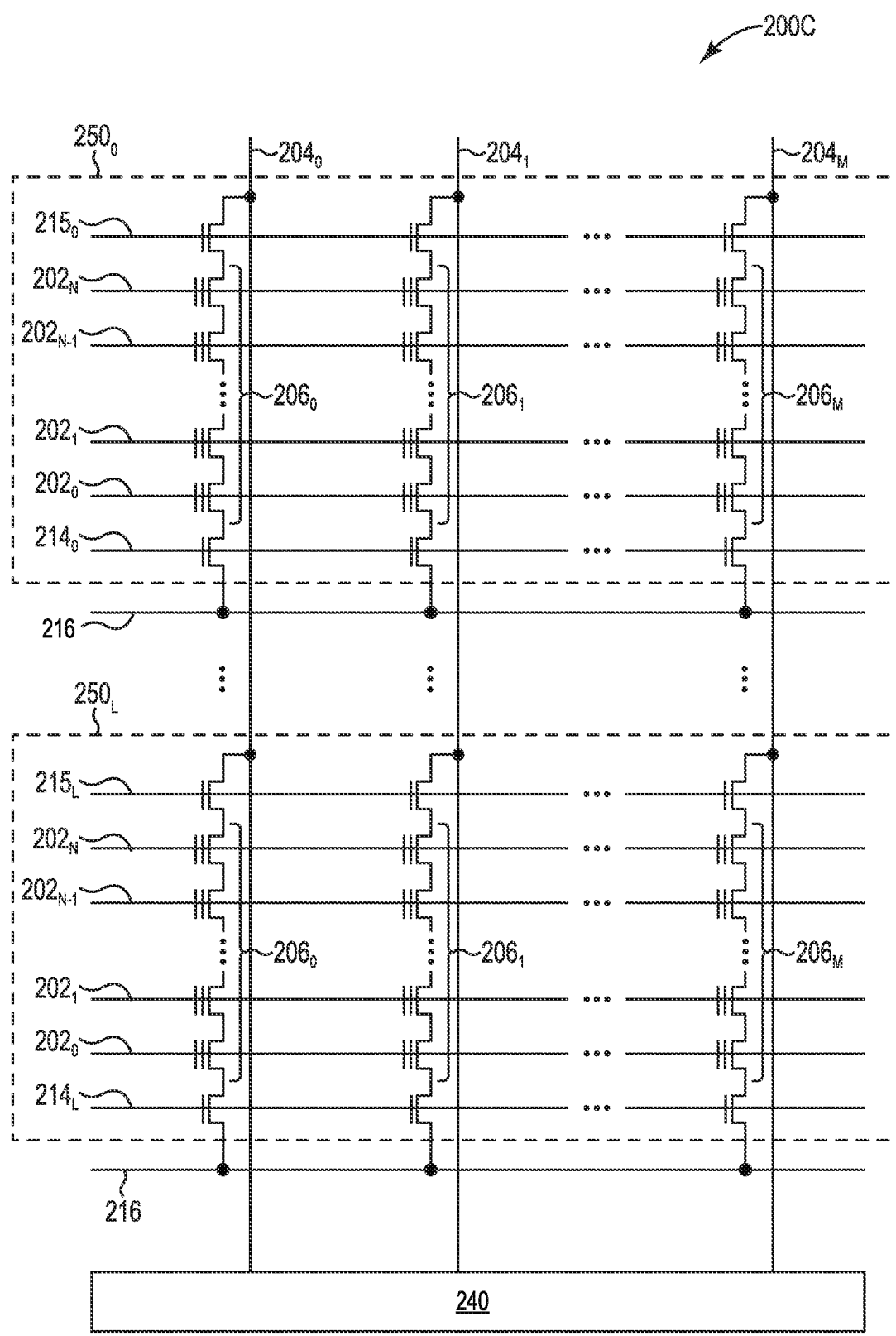

FIG. 2C is a further schematic of a portion of an array of memory cells 200C as could be used in a memory of the type described with reference to FIG. 1, e.g., as a portion of array of memory cells 104. Like numbered elements in FIG. 2C correspond to the description as provided with respect to FIG. 2A. Array of memory cells 200C may include strings of series-connected memory cells (e.g., NAND strings) 206, access (e.g., word) lines 202, data (e.g., bit) lines 204, select lines 214 (e.g., source select lines), select lines 215 (e.g., drain select lines) and source 216 as depicted in FIG. 2A. A portion of the array of memory cells 200A may be a portion of the array of memory cells 200C, for example. FIG. 2C depicts groupings of NAND strings 206 into blocks of memory cells 250, e.g., blocks of memory cells $250_0$ to $250_L$. Blocks of memory cells 250 may be groupings of memory cells 208 that may be erased together in a single erase operation, sometimes referred to as erase blocks. Each block of memory cells 250 might include those NAND strings 206 commonly associated with a single select line 215, e.g., select line $215_0$. The source 216 for the block of memory cells $250_0$ might be a same source as the source 216 for the block of memory cells $250_L$. For example, each block of memory cells $250_0$ to $250_L$ might be commonly selectively connected to the source 216. Access lines 202 and select lines 214 and 215 of one block of memory cells 250 may have no direct connection to access lines 202 and select lines 214 and 215, respectively, of any other block of memory cells of the blocks of memory cells $250_0$ to $250_L$.

The data lines $204_0$ to $204_M$ may be connected (e.g., selectively connected) to a buffer portion 240, which might be a portion of a data buffer of the memory. The buffer portion 240 might correspond to a memory plane (e.g., the set of blocks of memory cells $250_0$ to $250_L$). The buffer portion 240 might include sense circuits (not shown in FIG. 2C) for sensing data values indicated on respective data lines 204.

While the blocks of memory cells 250 of FIG. 2C depict only one select line 215 per block of memory cells 250, the blocks of memory cells 250 might include those NAND strings 206 commonly associated with more than one select line 215. For example, select line $215_0$ of block of memory cells $250_0$ might correspond to the select line $215_0$ of the memory array 200B of FIG. 2B, and the block of memory cells of the memory array 200C of FIG. 2C might further include those NAND strings 206 associated with select lines $215_1$ to $215_K$ of FIG. 2B. In such blocks of memory cells 250 having NAND strings 206 associated with multiple select lines 215, those NAND strings 206 commonly associated with a single select line 215 might be referred to as a sub-block of memory cells. Each such sub-block of memory cells might be selectively connected to the buffer portion 240 responsive to its respective select line 215.

Figure 3:
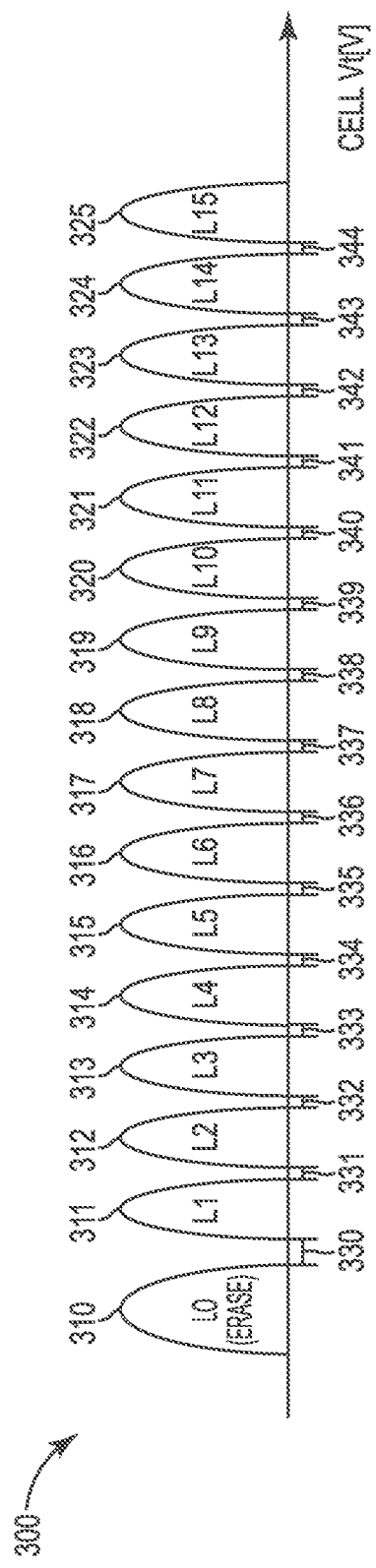
FIG. 3 depicts memory cell populations for a QLC memory after coarse programming according to an embodiment.

FIG. 3 depicts memory cell populations 300 for a QLC memory after coarse programming according to an embodiment. For simplicity, FIG. 3 and the following FIGS. 4-6 will presume programming operations for QLC memory cells, e.g., sixteen-level memory cells representing data states L0 to L15 using sixteen threshold voltage ranges, each representing a data state corresponding to a bit pattern of four digits. While discussed in reference to QLC memory cells, programming operations performed on lower storage density memory cells, e.g., TLC (eight data states) or higher storage density memory cells, e.g., PLC (32 data states) memory cells, are equally applicable.

In this example, the population of memory cells 310 might be erased memory cells and represent a logical data value of '1111', the population of memory cells 311 might represent a logical data value of '0111', the population of memory cells 312 might represent a logical data value of '0011', the population of memory cells 313 might represent a logical data value of '1011', the population of memory cells 314 might represent a logical data value of '1001', the population of memory cells 315 might represent a logical data value of '0001', the population of memory cells 316 might represent a logical data value of '0101', the population of memory cells 317 might represent a logical data value of '1101', the population of memory cells 318 might represent a logical data value of '1100', the population of memory cells 319 might represent a logical data value of '0100', the population of memory cells 320 might represent a logical data value of '0000', the population of memory cells 321 might represent a logical data value of '1000', the population of memory cells 322 might represent a logical data value of '1010', the population of memory cells 323 might represent a logical data value of '0010', the population of memory cells 324 might represent a logical data value of '0110', and the population of memory cells 325 might represent a logical data value of '1110' where the right-most digit might represent the lower page data for a memory cell having a threshold voltage within the threshold voltage range of its respective population of memory cells, the center-right digit might represent the upper page data for that memory cell, the center-left digit might represent the extra page data for that memory cell, and the left-most digit might represent the top page data for that memory cell. Although a specific example of binary representation is provided, embodiments may use other arrangements of bit patterns to represent the various data states.

A preliminary read window between the population of memory cells 310 and the population of memory cells 311 is indicated at 330, which is the distance (e.g., in voltage) between adjacent Vt distributions for the memory cells representing data states L0 and L1. The read window is preliminary since the populations of memory cells 300 programmed to coarse target values are not read. A preliminary read window between the population of memory cells 311 and the population of memory cells 312 is indicated at 331, which is the distance (e.g., in voltage) between adjacent Vt distributions for the memory cells representing data states L1 and L2. Likewise, a preliminary read window between the population of memory cells 312 to 324, and the population of memory cells 313 to 325 is indicated at 332 to 344, respectively, which is the distance between adjacent Vt distributions for the memory cells representing data states L2 to L15. A read window budget (RWB) may refer to a cumulative value of read windows for a group of programmed cells (e.g., one or more pages of cells). In this example, the preliminary RWB may be the cumulative value (e.g., in voltage) of the fifteen read windows 330 to 344 between the sixteen Vt distributions.

Figure 4:
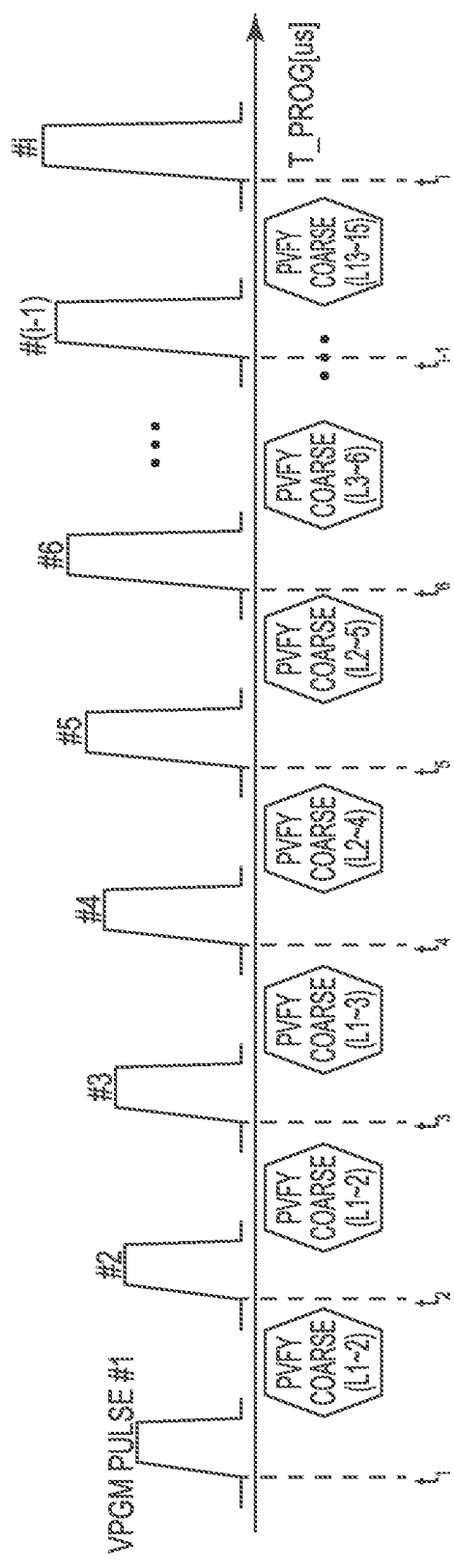
FIG. 4 is a timing diagram depicting a portion of a coarse programming operation to program selected QLC memory cells to coarse target threshold voltages according to an embodiment.

FIG. 4 is a timing diagram depicting a portion of a coarse programming operation to program selected QLC memory cells to coarse target levels L0 to L15 (e.g., as illustrated in FIG. 3) according to an embodiment. Once a selected memory cell has been programmed to its coarse target level, the memory cell is inhibited from further coarse programming. Prior to time $t_1$, memory cells selected for programming might be erased such that the selected memory cells each have a threshold voltage corresponding to level L0. At time $t_1$, a first program pulse may be applied to a selected access line (e.g., 202 of FIG. 2A) connected to the control gates (e.g., 236) of the selected memory cells (e.g., 208). After the first program pulse, a coarse program verify operation may be performed to verify whether a target population of the selected memory cells has been programmed to coarse level L1 or L2. At time $t_2$, a second program pulse, e.g., higher than the first program pulse, may be applied to the selected access line connected to the control gates of the selected memory cells. After the second program pulse, a coarse program verify operation may be performed to verify whether target populations of the selected memory cells have been programmed to coarse level L1 or L2.

At time $t_3$, a third program pulse, e.g., higher than the second program pulse, may be applied to the selected access line connected to the control gates of the selected memory cells. After the third program pulse, a coarse program verify operation may be performed to verify whether target populations of the selected memory cells have been programmed to coarse level L1, L2, or L3. At time $t_4$, a fourth program pulse, e.g., higher than the third program pulse, may be applied to the selected access line connected to the control gates of the selected memory cells. After the fourth program pulse, a coarse program verify operation may be performed to verify whether target populations of the selected memory cells have been programmed to coarse level L2, L3, or L4. At time $t_5$, a fifth program pulse, e.g., higher than the fourth program pulse, may be applied to the selected access line connected to the control gates of the selected memory cells. After the fifth program pulse, a coarse program verify operation may be performed to verify whether target populations of the selected memory cells have been programmed to coarse level L2, L3, L4, or L5.

At time $t_6$, a sixth program pulse, e.g., higher than the fifth program pulse, may be applied to the selected access line connected to the control gates of the selected memory cells. After the sixth program pulse, a coarse program verify operation may be performed to verify whether target populations of the selected memory cells have been programmed to coarse level L3, L4, L5, or L6 and the programming pulses and coarse program verify operations continue. At time another program pulse, e.g., higher than the previous program pulse, may be applied to the selected access line connected to the control gates of the selected memory cells, where "i" is any suitable number. After the program pulse, a program verify operation may be performed to verify whether target populations of the selected memory cells have been programmed to coarse level L13, L14, or L15. At time $t_i$, another program pulse, e.g., higher than the previous program pulse, may be applied to the selected access line connected to the control gates of the selected memory cells and the process may repeat until the selected memory cells have been programmed to their coarse target levels.

Figure 5:
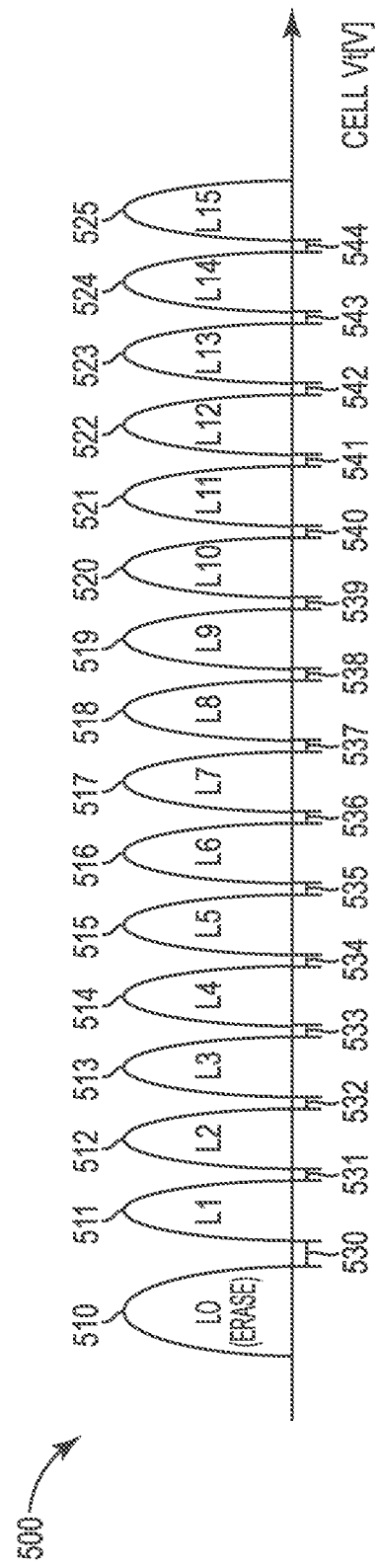
FIG. 5 depicts memory cell populations for a QLC memory after fine programming according to an embodiment.

FIG. 5 depicts memory cell populations 500 for a QLC memory after fine programming according to an embodiment. Populations of memory cells 510 to 525 correspond to populations of memory cells 310 to 325 of FIG. 3, respectively, after the populations of memory cells 310 to 325 are moved from the coarse target values to fine target values. A read window between the population of memory cells 510 and the population of memory cells 511 is indicated at 530, which is the distance (e.g., in voltage) between adjacent Vt distributions for the memory cells representing data states L0 and L1. A read window between the population of memory cells 511 and the population of memory cells 512 is indicated at 531, which is the distance (e.g., in voltage) between adjacent Vt distributions for the memory cells representing data states L1 and L2. Likewise, a read window between the population of memory cells 512 to 524, and the population of memory cells 513 to 525 is indicated at 532 to 544, respectively, which is the distance between adjacent Vt distributions for the memory cells representing data states L2 to L15. In this example, the RWB may be the cumulative value (e.g., in voltage) of the fifteen read windows 520 to 544 between the sixteen Vt distributions. As shown in FIG. 5, the RWB for the populations of memory cells 500 after fine programming is greater than the preliminary RWB for the populations of memory cells 300 after coarse programming.

Figure 6:
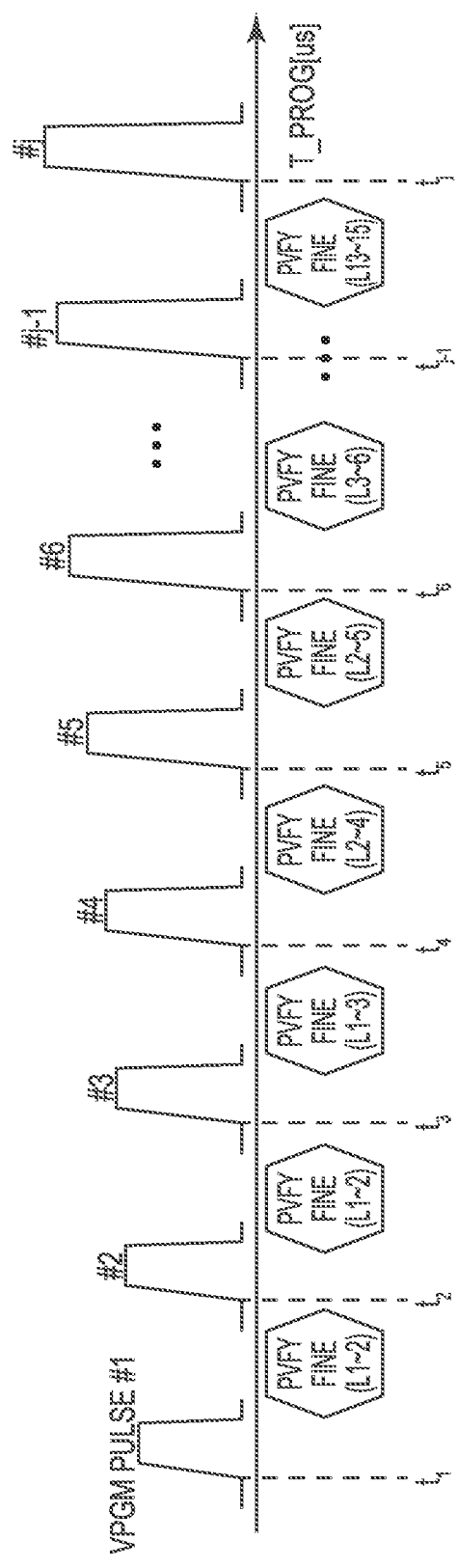
FIG. 6 is a timing diagram depicting a portion of a fine programming operation to program selected QLC memory cells to fine target threshold voltages according to an embodiment.

FIG. 6 is a timing diagram depicting a portion of a fine programming operation to program selected QLC memory cells to fine (e.g., final) target levels L0 to L15 (e.g., as illustrated in FIG. 5) according to an embodiment. Once a selected memory cell has been programmed to its fine target level, the memory cell is inhibited from further programming. Prior to time $t_1$, the selected memory cells are programmed to their coarse target levels as illustrated in FIGS. 3 and 4. In addition, a page of memory cells adjacent to the selected memory cells may have been programmed to their coarse target levels. At time $t_1$, a first program pulse may be applied to a selected access line (e.g., 202 of FIG. 2A) connected to the control gates (e.g., 236) of the selected memory cells (e.g., 208). After the first program pulse, a fine program verify operation may be performed to verify whether a target population of the selected memory cells has been programmed to fine level L1 or L2. At time $t_2$, a second program pulse, e.g., higher than the first program pulse, may be applied to the selected access line connected to the control gates of the selected memory cells. After the second program pulse, a fine program verify operation may be performed to verify whether target populations of the selected memory cells have been programmed to fine level L1 or L2.

At time $t_3$, a third program pulse, e.g., higher than the second program pulse, may be applied to the selected access line connected to the control gates of the selected memory cells. After the third program pulse, a fine program verify operation may be performed to verify whether target populations of the selected memory cells have been programmed to fine level L1, L2, or L3. At time $t_4$, a fourth program pulse, e.g., higher than the third program pulse, may be applied to the selected access line connected to the control gates of the selected memory cells. After the fourth program pulse, a fine program verify operation may be performed to verify whether target populations of the selected memory cells have been programmed to fine level L2, L3, or L4. At time $t_5$, a fifth program pulse, e.g., higher than the fourth program pulse, may be applied to the selected access line connected to the control gates of the selected memory cells. After the fifth program pulse, a fine program verify operation may be performed to verify whether target populations of the selected memory cells have been programmed to fine level L2, L3, L4, or L5.

At time $t_6$, a sixth program pulse, e.g., higher than the fifth program pulse, may be applied to the selected access line connected to the control gates of the selected memory cells. After the sixth program pulse, a fine program verify operation may be performed to verify whether target populations of the selected memory cells have been programmed to fine level L3, L4, L5, or L6 and the programming pulses and fine program verify operations continue. At time $t_{j-1}$, another program pulse, e.g., higher than the previous program pulse, may be applied to the selected access line connected to the control gates of the selected memory cells, where "j" is any suitable number. After the program pulse, a program verify operation may be performed to verify whether target populations of the selected memory cells have been programmed to fine level L13, L14, or L15. At time $t_j$, another program pulse, e.g., higher than the previous program pulse, may be applied to the selected access line connected to the control gates of the selected memory cells and the process may repeat until the selected memory cells have been programmed to their fine target levels.

Figure 7:
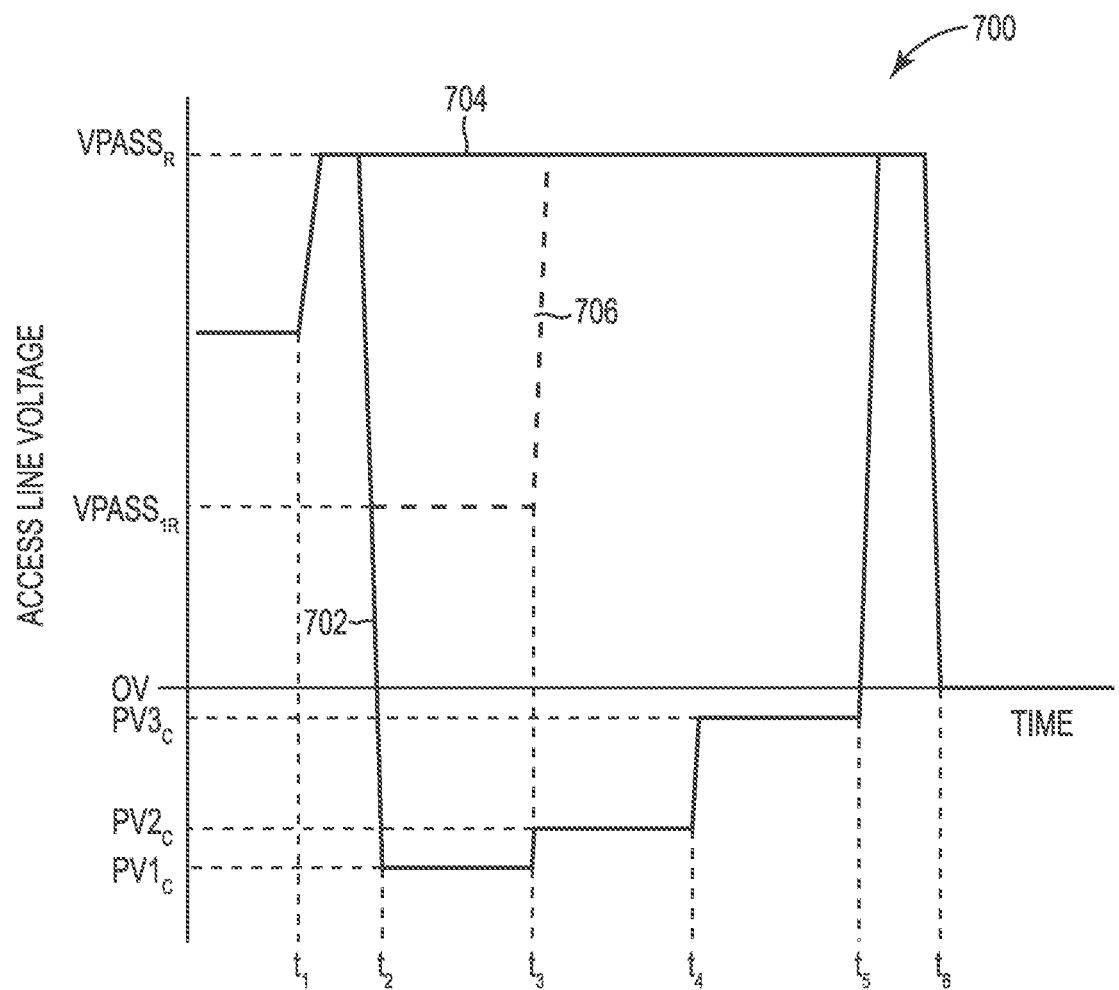
FIG. 7 is a timing diagram depicting voltage levels applied to access lines of an array of memory cells during a coarse programming operation.

FIG. 7 is a timing diagram 700 depicting voltage levels applied to access lines of an array of memory cells during a coarse programming operation. Trace 702 may correspond to voltage levels applied to a first (e.g., selected) access line (e.g., $202_{X+2}$) of an array of memory cells (e.g., 200A of FIG. 2A) connected to a selected memory cell (e.g., $208_{X+2}$ of NAND string $206_0$). Trace 704 may correspond to voltage levels applied to a second (e.g., unselected) access line (e.g., $202_{X+1}$) adjacent to the first access line. Trace 706 may correspond to voltage levels applied to a third (e.g., unselected) access line (e.g., $202_{X+3}$) adjacent to the first access line and connected to an erased memory cell (e.g., $208_{X+3}$ of NAND string $206_0$). Trace 704 may also correspond to voltage levels applied to other unselected access lines (e.g., $202_0$ to $202_X$ and $202_{X+4}$ to $202_N$).

Prior to programming the selected memory cell $208_{X+2}$ of NAND string $206_0$, the selected memory cell $208_{X+2}$ of NAND string $206_0$ might be erased, the adjacent memory cell $208_{X+3}$ of NAND string $206_0$ might be erased, and the adjacent memory cell $208_{X+1}$ of NAND string $206_0$ might be programmed to a coarse target level. Prior to time $t_1$, a series-program pulse (e.g., program pulse 1, 2, or 3 of FIG. 4) is applied to the selected access line to program the selected memory cell $208_{X+2}$ of NAND string $206_0$ to coarse level L1. At time $t_1$, a pass voltage $VPASS_R$ is applied to all the access lines $202_0$ to $202_N$. At time $t_2$, the selected access line $202_{X+2}$ is biased to a coarse program verify level L1 ($PV1_C$) (e.g., a first voltage level). Also at time $t_2$, the $VPASS_R$ voltage level (e.g., a second voltage level higher than the first voltage level) remains applied to access lines $202_0$ to $202_{X+1}$ and $202_{X+4}$ to $202_N$. Also at time $t_2$, another pass voltage $VPASS_{1R}$ (e.g., a third voltage level between the first voltage level and the second voltage level) is applied to access line $202_{X+3}$. By applying $VPASS_{1R}$ instead of $VPASS_R$ to access line $202_{X+3}$, the effective coarse program verify for level L1 is reduced due to capacitive coupling between the selected memory cell $208_{X+2}$ and the adjacent memory cell $208_{X+3}$. Between times $t_2$ and $t_3$, the threshold voltage of the selected memory cell $208_{X+2}$ is sensed.

At time $t_3$, the coarse program verify for level L1 is complete and the coarse program verify for memory cells to be programmed to the coarse level L2 begins. At time $t_3$, a coarse program verify for level L2 ($PV2_C$) is applied to the selected access line $202_{X+2}$, which is higher than $PV1_C$. Also at time $t_3$, $VPASS_R$ is applied to the adjacent access line $202_{X+3}$. Between times $t_3$ and $t_4$, the threshold voltage of the selected memory cell $208_{X+2}$ is sensed. At time $t_4$, the coarse program verify for level L2 is complete and the coarse program verify for memory cells to be programmed to the coarse level L3 begins. At time $t_4$, a coarse program verify for level L3 ($PV3_C$) is applied to the selected access line $202_{X+2}$, which is higher than $PV2_C$. Also at time $t_4$, the $VPASS_R$ voltage level remains applied to the adjacent access line $202_{X+3}$. Between times $t_4$ and $t_5$, the threshold voltage of the selected memory cell $208_{X+2}$ is sensed. At time $t_5$, the coarse program verify operations for levels L1, L2, and L3 are complete and $VPASS_R$ is applied to the selected access line $202_{X+2}$. At time $t_6$, 0V is applied to the access lines $202_0$ to $202_N$ and the programming process as previously described and illustrated with reference to FIGS. 3-6 continues. Accordingly, $VPASS_{1R}$ is applied to the adjacent access line during program verify operations for target memory cells to be programmed to the coarse level L1 to effectively shift $PV1_C$ lower than the minimum negative voltage source of the memory device.

In the following FIGS. 8A-10D, programming operations might proceed from the source-side to the drain-side. Accordingly, the target memory cell and the memory cells between the drain select transistor and the target memory cell for the selected string of series-connected memory cells might be in an erased state, while the memory cells between the target memory cell and the source select transistor for the selected string of series-connected memory cells might be in a programmed state.

FIGS. 8A-8G are flowcharts of a method 800 for programming an array of memory cells in accordance with an embodiment. Method 800 may correspond at least in part to FIGS. 3-7. For example, FIG. 8A-8G might represent a method to perform a program operation, e.g., programming one or more memory cells to target levels. The method might be in the form of computer-readable instructions, e.g., stored in the instruction registers 128 of FIG. 1. Such computer-readable instructions might be executed by a controller, e.g., the control logic 116, to cause the memory device 100 to perform the method.

Method 800 might be implemented within a memory device (e.g., 100) including an array of memory cells (e.g., 104) including a plurality of strings (e.g., 206) of series-connected memory cells, a plurality of access lines (e.g., 202), where each access line is connected to a control gate (e.g., 236) of a respective memory cell (e.g., 208) of each string of series-connected memory cells, and a controller (e.g., 116) configured to access the array of memory cells (e.g., TLC memory cells, QLC memory cells, or PLC memory cells) to program a selected memory cell of the array of memory cells to a first target level (e.g., coarse level L1). The following discussion will be made with reference to at least FIG. 2A and will presume that the selected memory cell is the memory cell $208_{X+1}$ of NAND string $206_0$. The access line $202_{X+1}$ may be referred to as the selected access line as it contains the selected memory cell, while remaining access lines 202 may be referred to as unselected access lines. The NAND string $206_0$ may be referred to as the selected string of series-connected memory cells as it contains the selected memory cell.

Figure 8A:
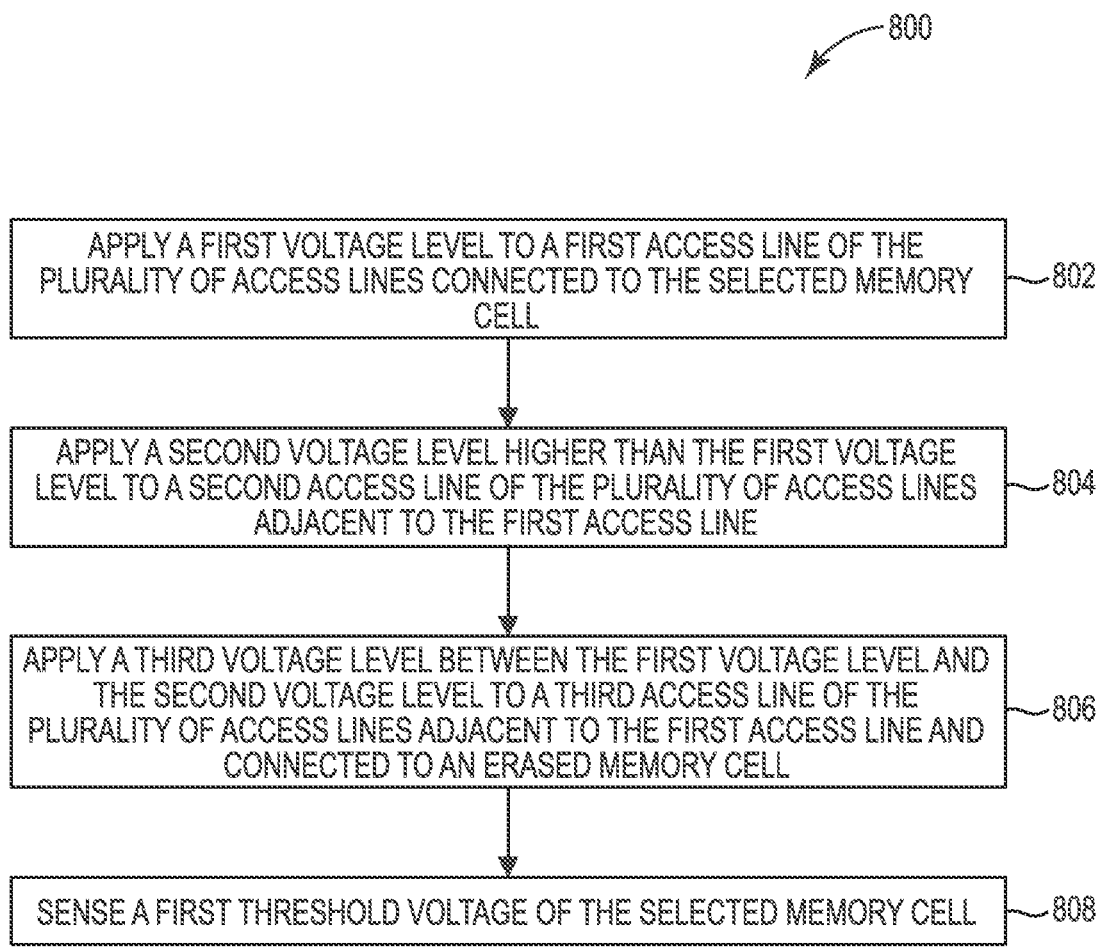
FIGS. 8A-8G are flowcharts of a method for programming an array of memory cells in accordance with an embodiment.

As illustrated in FIG. 8A at 802, the controller may apply a first voltage level (e.g., $PV1_C$ of FIG. 7) to a first access line $202_{X+1}$ of the plurality of access lines connected to the selected memory cell $208_{X+1}$ of NAND string $206_0$. At 804, the controller may apply a second voltage level (e.g., $VPASS_R$ of FIG. 7) higher than the first voltage level to a second access line $202_X$ of the plurality of access lines adjacent to the first access line $202_{X+1}$. At 806, the controller may apply a third voltage level (e.g., $VPASS_{1R}$ of FIG. 7) between the first voltage level and the second voltage level to a third access line $202_{X+2}$ of the plurality of access lines adjacent to the first access line $202_{X+1}$ and connected to an erased memory cell $208_{X+2}$ of NAND string $206_0$. At 808, the controller may sense a first threshold voltage of the selected memory cell $208_{X+1}$ of NAND string $206_0$.

Figure 8B:
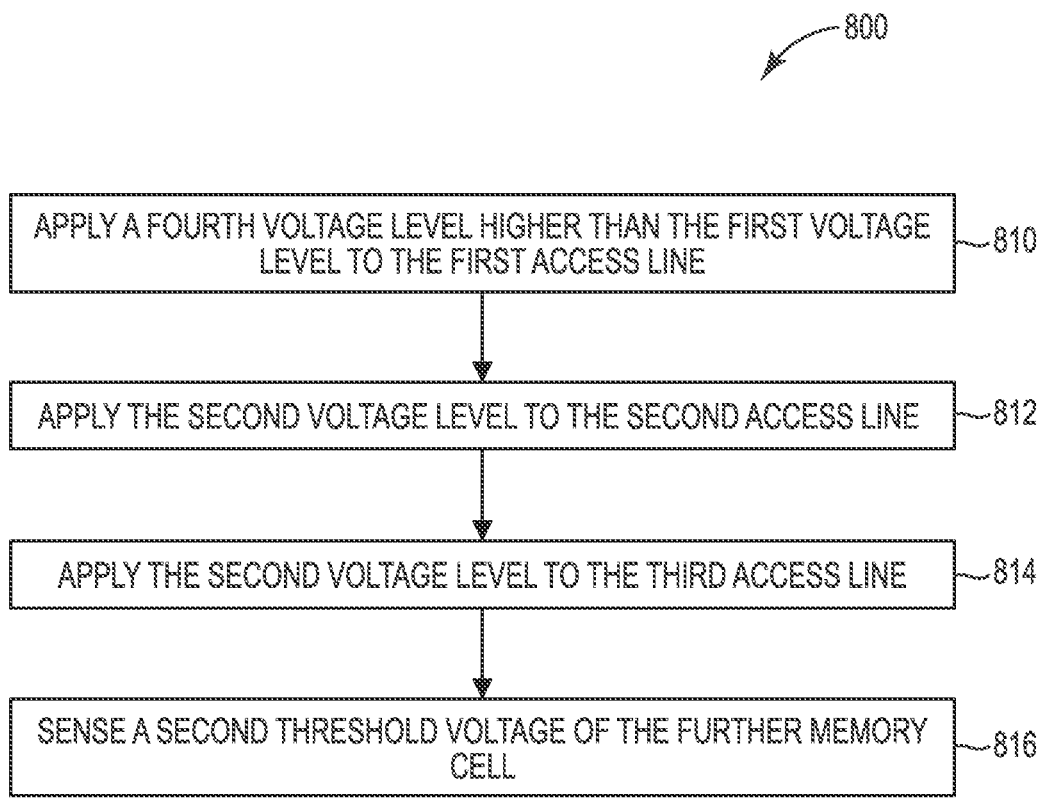

With the selected memory cell $208_{X+1}$ of NAND string $206_0$ programmed to the first target level (e.g., coarse level L1), in one example, the controller may be further configured to access the array of memory cells to program a further memory cell (e.g., $208_{X+1}$ of NAND string $206_2$) of the array of memory cells connected to the first access line $202_{X+1}$ to a second target level (e.g., coarse level L2, L3, etc.) higher than the first target level (e.g., coarse level L1). In this example, as illustrated in FIG. 8B at 810, the controller may further apply a fourth voltage level (e.g., $PV2_C$, $PV3_C$, etc.) higher than the first voltage level to the first access line $202_{X+1}$. At 812, the controller may further apply the second voltage level (e.g., $VPASS_R$) to the second access line $202_X$. At 814, the controller may further apply the second voltage level (e.g., $VPASS_R$) to the third access line $202_{X+2}$. At 816, the controller may further sense a second threshold voltage of the further memory cell (e.g., $208_{X+1}$ of NAND string $206_2$). Thus, in this example, since the further memory cell (e.g., $208_{X+1}$ of NAND string $206_2$) is not being programmed to the coarse level L1, $VPASS_{1R}$ is not used.

Figure 8C:
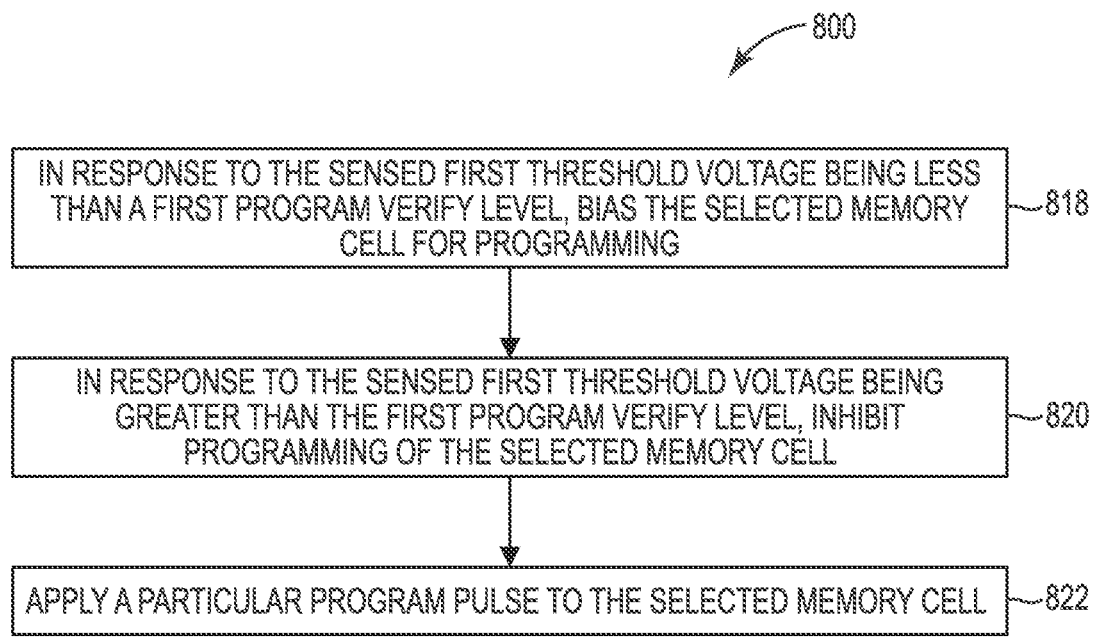

As illustrated in FIG. 8C at 818, the controller may further in response to the sensed first threshold voltage being less than a first program verify level (e.g., shifted down $PV1_C$), bias the selected memory cell $208_{X+1}$ of NAND string $206_0$ for programming (e.g., by applying a reference voltage [e.g., GND] to the data line $204_0$). At 820, the controller may further in response to the sensed first threshold voltage being greater than the first program verify level, inhibit programming of the selected memory cell (e.g., by applying a supply voltage [e.g., Vcc] to the data line $204_0$). At 822, the controller may further apply a particular program pulse to the selected memory cell $208_{X+1}$ of NAND string $206_0$.

In one example, the third voltage level (e.g., $VPASS_{1R}$) is selected such that capacitive coupling between the first access line $202_{X+1}$ and the third access line $202_{X+2}$ reduces the voltage level on the first access line from the first voltage level (e.g., $PV1_C$). In some examples, the first voltage level (e.g., $PV1_C$) is less than −1V, the second voltage level (e.g., $VPASS_R$) is greater than 6V, and the third voltage level (e.g., $VPASS_{1R}$) is within a range between 1V and 5V.

Figure 8D:
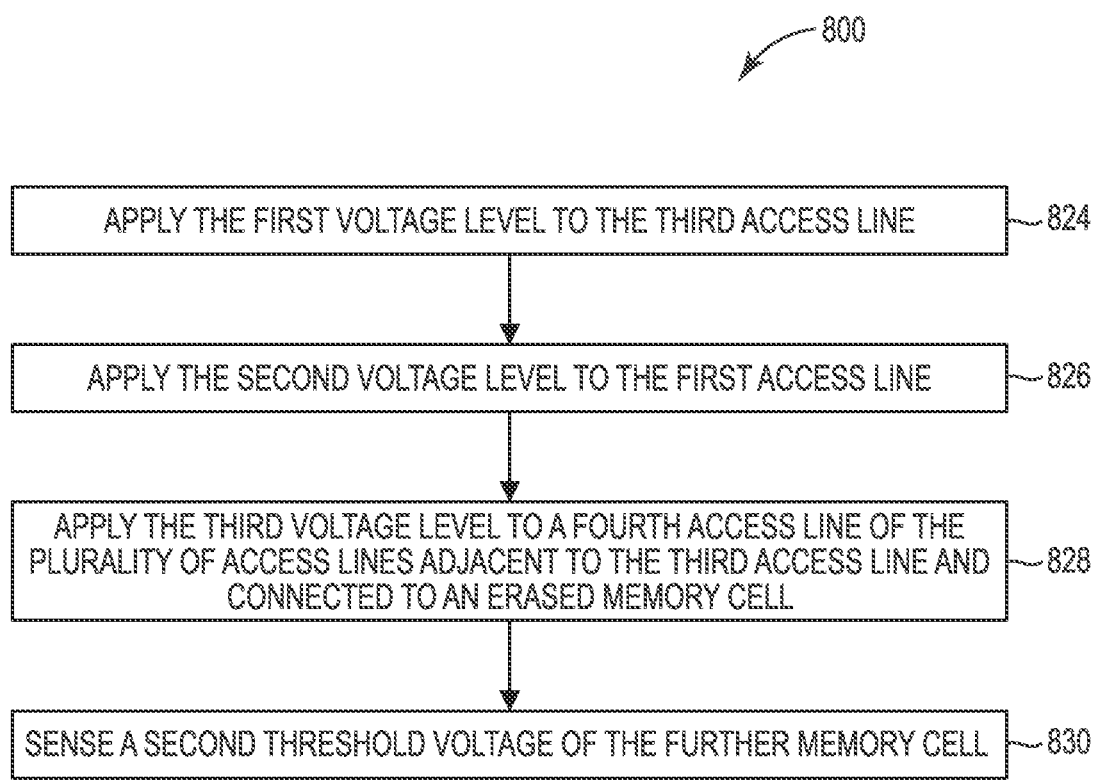

In one example, the controller is further configured to access the array of memory cells to program a further memory cell (e.g., $208_{X+2}$ of NAND string $206_0$) of the array of memory cells connected to the third access line $202_{X+2}$ to the first target level (e.g., coarse level L1). In this example, with the sensed first threshold voltage greater than the first program verify level, as illustrated in FIG. 8D at 824, the controller may further apply the first voltage level (e.g., $PV1_C$) to the third access line $202_{X+2}$. At 826, the controller may further apply the second voltage level (e.g., $VPASS_R$) to the first access line $202_{X+1}$. At 828, the controller may further apply the third voltage level (e.g., $VPASS_{1R}$) to a fourth access line $202_{X+3}$ of the plurality of access lines adjacent to the third access line $202_{X+2}$ and connected to an erased memory cell $208_{X+3}$ of NAND string $206_0$. At 830, the controller may further sense a second threshold voltage of the further memory cell (e.g., $208_{X+2}$ of NAND string $206_0$).

Figure 8E:
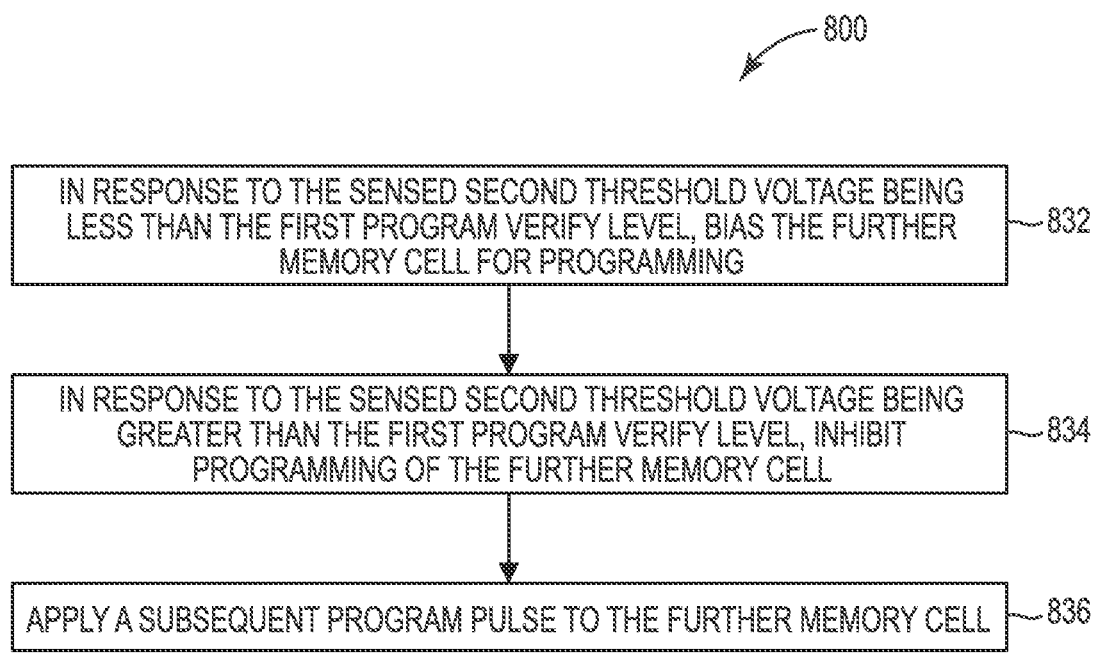

As illustrated in FIG. 8E at 832, the controller may further in response to the sensed second threshold voltage being less than the first program verify level (e.g., shifted down $PV1_C$), bias the further memory cell (e.g., $208_{X+2}$ of NAND string $206_0$) for programming. At 834, the controller may further in response to the sensed second threshold voltage being greater than the first program verify level, inhibit programming of the further memory cell. At 836, the controller may further apply a subsequent program pulse to the further memory cell (e.g., $208_{X+2}$ of NAND string $206_0$).

Figure 8F:
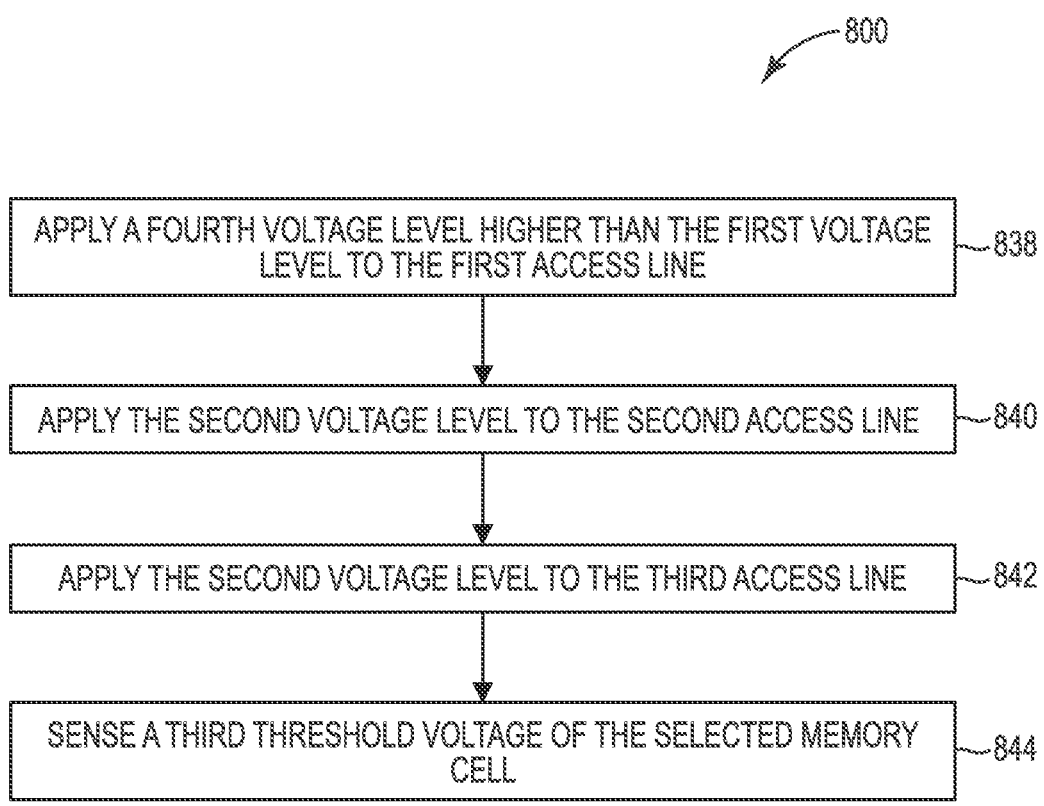

With the sensed second threshold voltage greater than the first program verify level, as illustrated in FIG. 8F at 838, the controller may further apply a fourth voltage level (e.g., $PV1_F$) higher than the first voltage level to the first access line $202_{X+1}$. At 840, the controller may further apply the second voltage level (e.g., $VPASS_R$) to the second access line $202_X$. At 842, the controller may further apply the second voltage level (e.g., $VPASS_R$) to the third access line $202_{X+2}$. At 844, the controller may further sense a third threshold voltage of the selected memory cell $208_{X+1}$ of NAND string $206_0$. FIG. 8F may correspond to the fine programming of the selected memory cell $208_{X+1}$ of NAND string $206_0$.

Figure 8G:
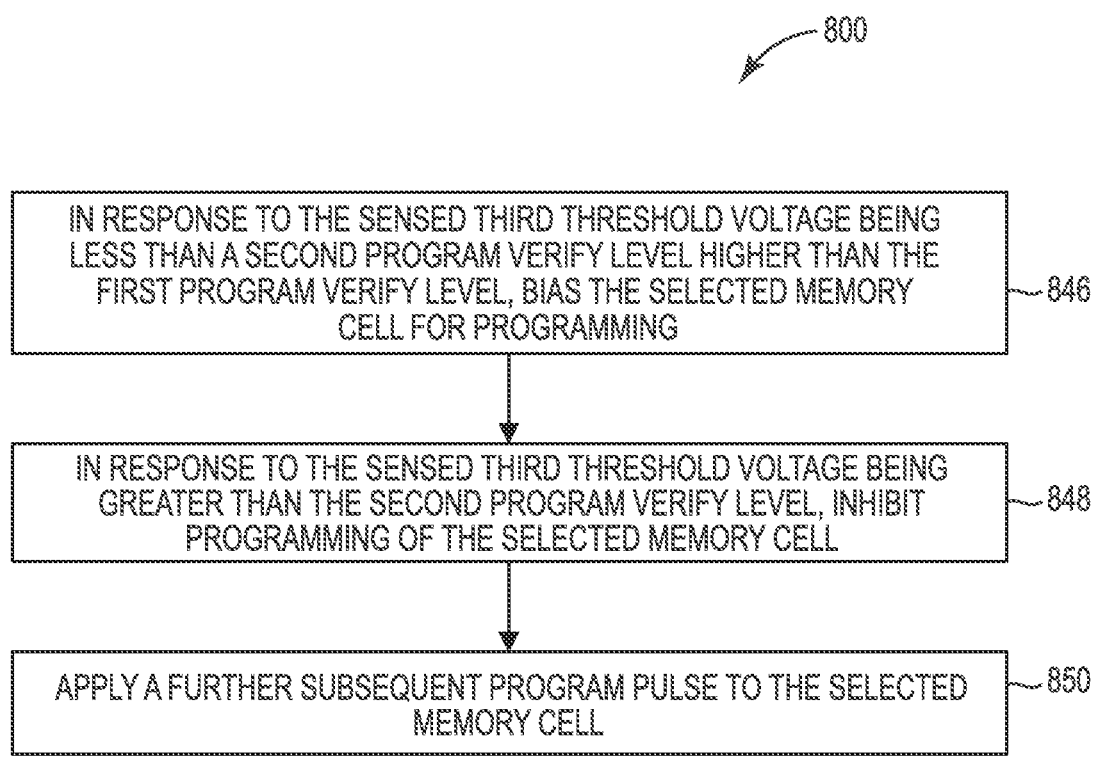

As illustrated in FIG. 8G at 846, the controller may further in response to the sensed third threshold voltage being less than a second program verify level (e.g., $PV1_F$) higher than the first program verify level (e.g., shifted down $PV1_C$), bias the selected memory cell $208_{X+1}$ of NAND string $206_0$ for programming. At 848, the controller may further in response to the sensed third threshold voltage being greater than the second program verify level (e.g., $PV1_F$), inhibit programming of the selected memory cell $208_{X+1}$ of NAND string $206_0$. At 850, the controller may further apply a further subsequent program pulse to the selected memory cell $208_{X+1}$ of NAND string $206_0$.

Figure 9A:
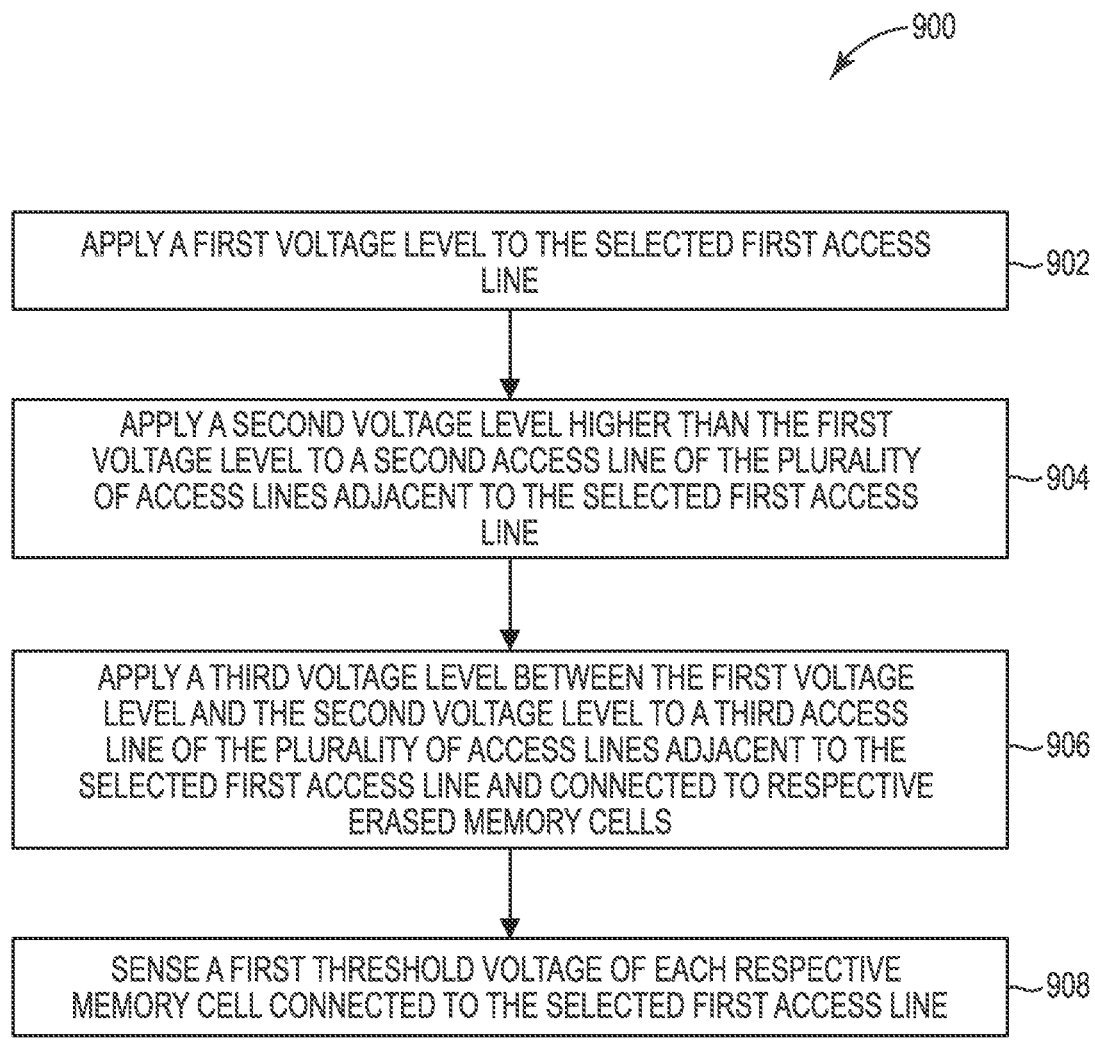
FIGS. 9A-9C are flowcharts of a method for programming an array of memory cells in accordance with another embodiment.
Figure 9B:
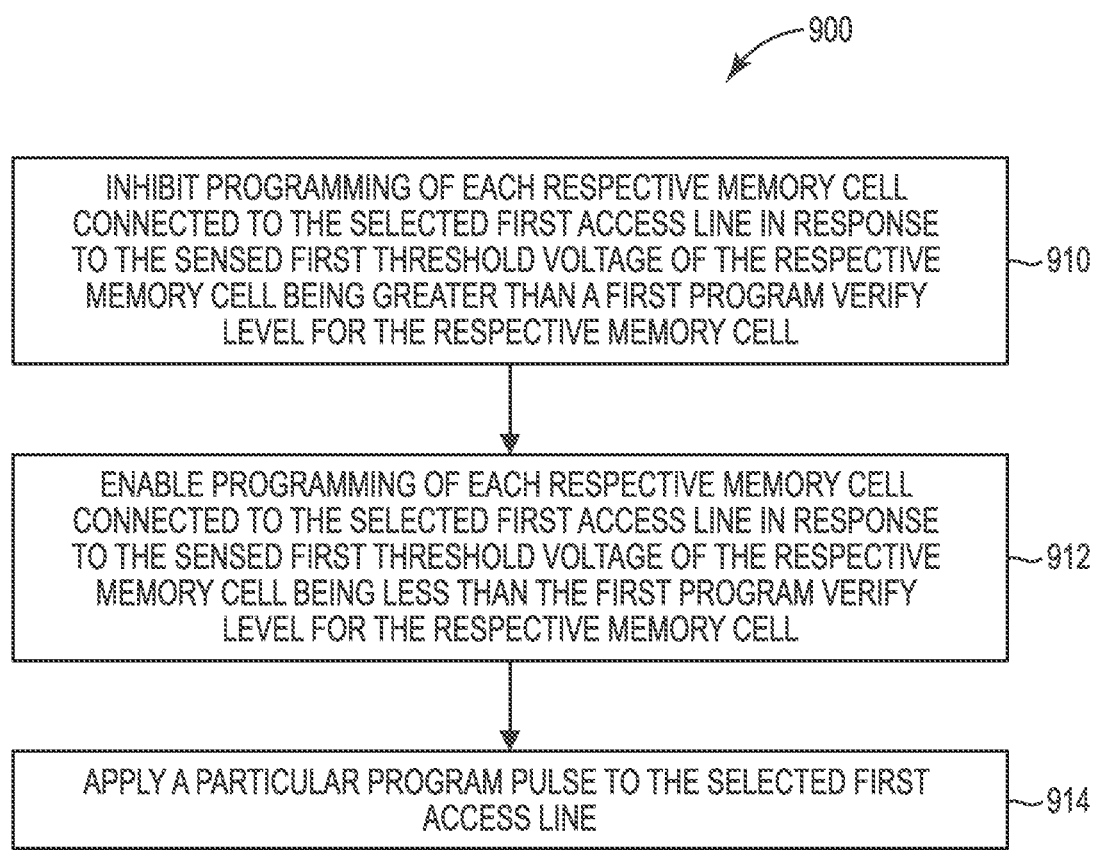
Figure 9C:
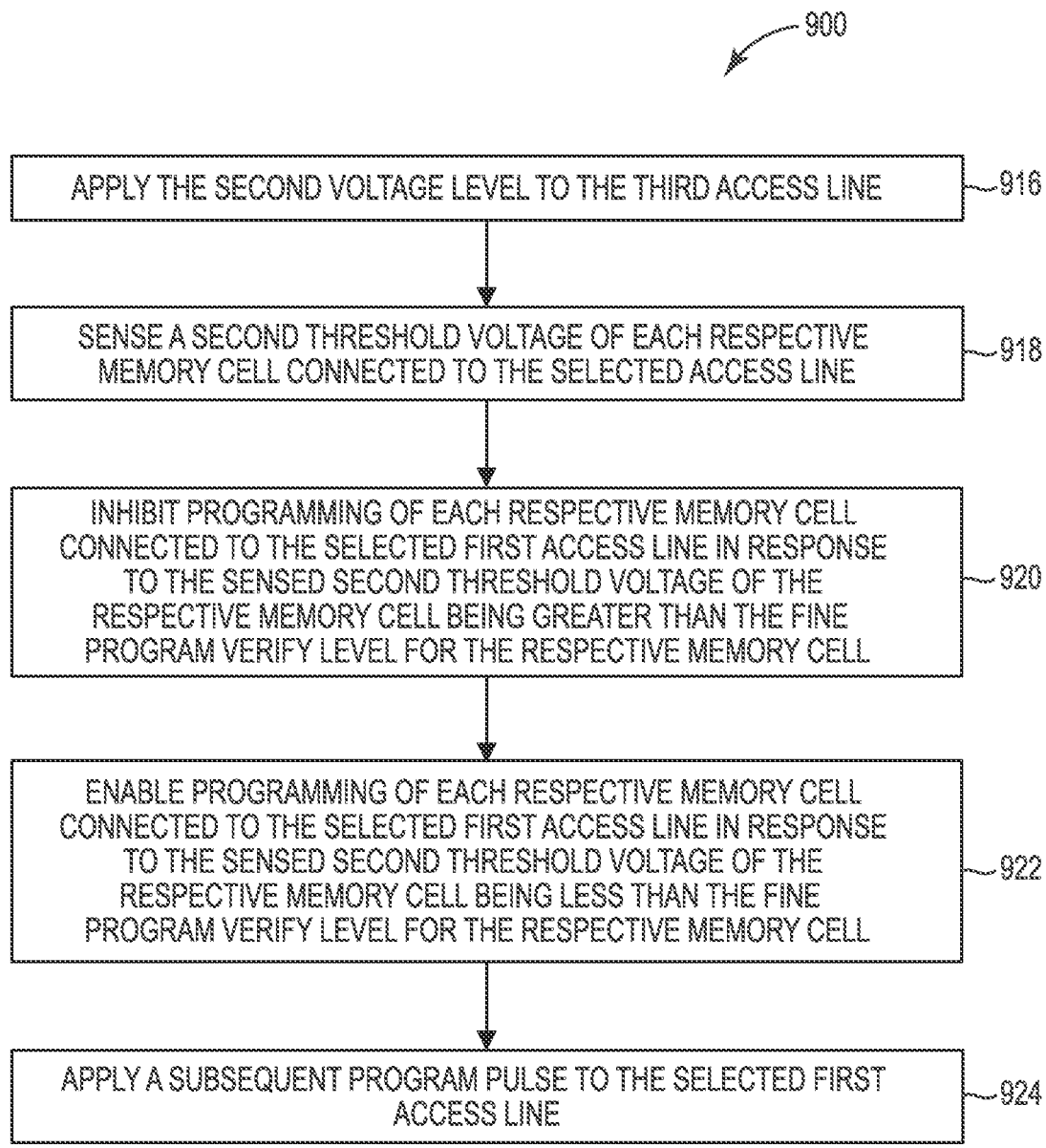

FIGS. 9A-9C are flowcharts of a method for programming an array of memory cells (e.g., QLC memory cells) in accordance with another embodiment. Method 900 may correspond at least in part to FIGS. 3-7. For example, FIG. 9A-9C might represent a method to perform a program operation, e.g., programming one or more memory cells to target levels. The method might be in the form of computer-readable instructions, e.g., stored to the instruction registers 128 of FIG. 1. Such computer-readable instructions might be executed by a controller, e.g., the control logic 116, to cause the memory device 100 to perform the method.

Method 900 might be implemented within a memory device (e.g., 100) including an array of memory cells (e.g., 104) including a plurality of strings (e.g., 206) of series-connected memory cells, a plurality of access lines (e.g., 202), where each access line is connected to a control gate (e.g., 236) of a respective memory cell (e.g., 208) of each string of series-connected memory cells, and a controller (e.g., 116) configured to program each respective memory cell connected to a selected first access line of the plurality of access lines to a respective target level. The following discussion will be made with reference to at least FIG. 2A and will presume that the selected first access line is the access line $202_{X+1}$.

As illustrated in FIG. 9A at 902, the controller may apply a first voltage level (e.g., $PV1_C$) to the selected first access line $202_{X+1}$. At 904, the controller may apply a second voltage level (e.g., $VPASS_R$) higher than the first voltage level to a second access line $202_X$ of the plurality of access lines adjacent to the selected first access line $202_{X+1}$. At 906, the controller may apply a third voltage level (e.g., $VPASS_{1R}$) between the first voltage level and the second voltage level to a third access line $202_{X+2}$ of the plurality of access lines adjacent to the selected first access line $202_{X+1}$ and connected to respective erased memory cells $208_{X+2}$. At 908, the controller may sense a first threshold voltage of each respective memory cell $208_{X+1}$ connected to the selected first access line $202_{X+1}$.

As illustrated in FIG. 9B at 910, the controller may further inhibit programming of each respective memory cell $208_{X+1}$ connected to the selected first access line $202_{X+1}$ in response to the sensed first threshold voltage of the respective memory cell being greater than a first program verify level (e.g., shifted down $PV1_C$) for the respective memory cell. At 912, the controller may further enable programming of each respective memory cell $208_{X+1}$ connected to the selected first access line $202_{X+1}$ in response to the sensed first threshold voltage of the respective memory cell being less than the first program verify level for the respective memory cell. In one example, the first program verify level for each respective memory cell includes a coarse program verify level less than a fine program verify level for each respective memory cell. At 914, the controller may further apply a particular program pulse to the selected first access line $202_{X+1}$.

With the coarse programming of each respective memory cell $208_{X+1}$ connected to the selected first access line $202_{X+1}$ complete, as illustrated in FIG. 9C at 916, the controller may further apply the second voltage level (e.g., $VPASS_R$) to the third access line $202_{X+2}$. At 918, the controller may further sense a second threshold voltage of each respective memory cell $208_{X+1}$ connected to the selected access line $202_{X+1}$. At 920, the controller may further inhibit programming of each respective memory cell $208_{X+1}$ connected to the selected first access line $202_{X+1}$ in response to the sensed second threshold voltage of the respective memory cell being greater than the fine program verify level for the respective memory cell. At 922, the controller may further enable programming of each respective memory cell $208_{X+1}$ connected to the selected first access line $202_{X+1}$ in response to the sensed second threshold voltage of the respective memory cell being less than the fine program verify level for the respective memory cell. At 924, the controller may further apply a subsequent program pulse to the selected first access line $202_{X+1}$.

FIGS. 10A-10D are flowcharts of a method 1000 for programming an array of memory cells (e.g., QLC memory cells) in accordance with another embodiment. Method 1000 may correspond at least in part to FIGS. 3-7. For example, FIG. 10A-10D might represent a method to perform a program operation, e.g., programming one or more memory cells to target levels. The method might be in the form of computer-readable instructions, e.g., stored to the instruction registers 128 of FIG. 1. Such computer-readable instructions might be executed by a controller, e.g., the control logic 116, to cause the memory device 100 to perform the method. The following discussion will be made with reference to at least FIG. 2A and will presume that the first access line is the access line $202_{X+1}$ and the selected memory cell is memory cell $208_{X+1}$ of NAND string $206_0$.

Figure 10A:
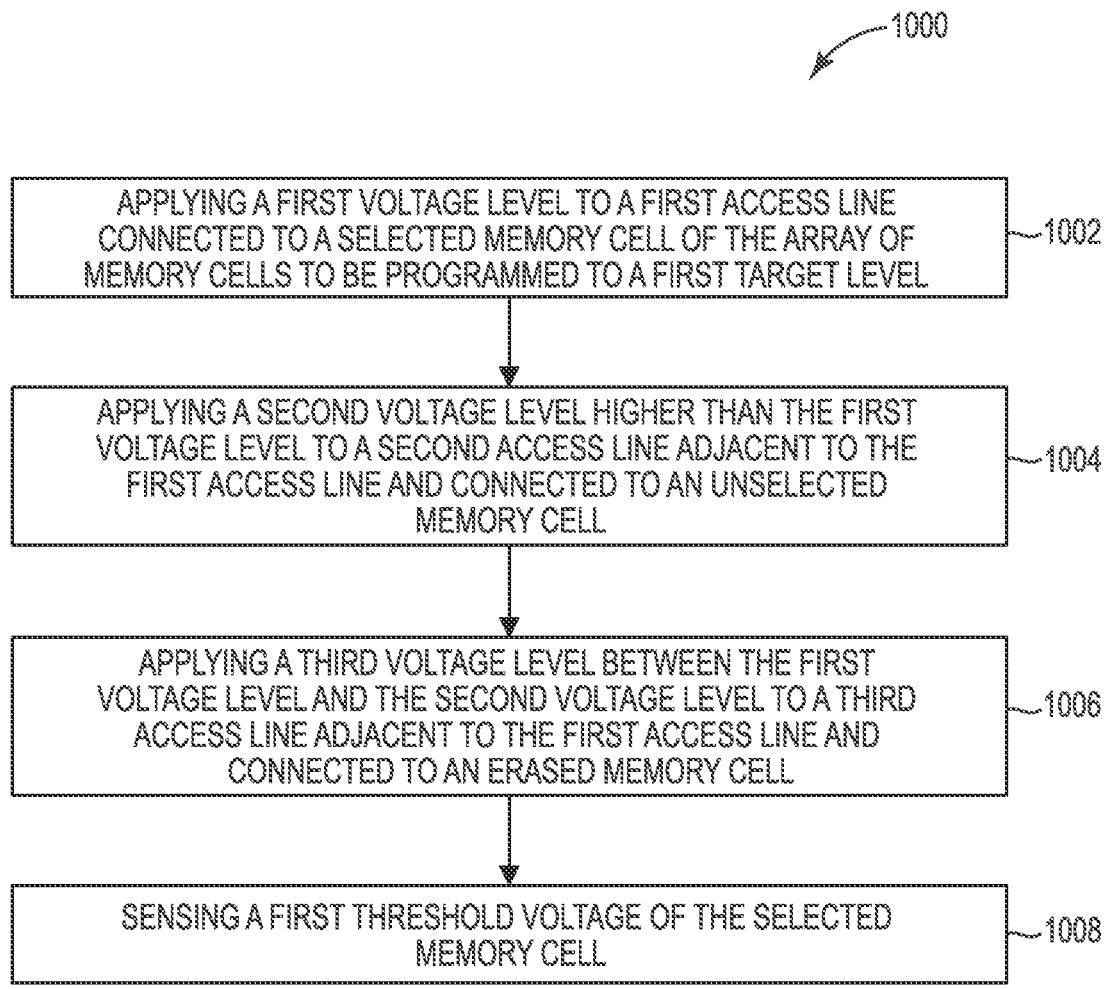
FIGS. 10A-10D are flowcharts of a method for programming an array of memory cells in accordance with another embodiment.

As illustrated in FIG. 10A at 1002, method 1000 may include applying a first voltage level (e.g., $PV1_C$) to a first access line $202_{X+1}$ connected to a selected memory cell $208_{X+1}$ of NAND string $206_0$ of the array of memory cells to be programmed to a first target level (e.g., coarse level L1). At 1004, method 1000 may include applying a second voltage level (e.g., $VPASS_R$) higher than the first voltage level (e.g., $PV1_C$) to a second access line $202_X$ adjacent to the first access line $202_{X+1}$ and connected to an unselected memory cell $208_X$ of NAND string $206_0$. At 1006, method 1000 may include applying a third voltage level (e.g., $VPASS_{1R}$) between the first voltage level (e.g., $PV1_C$) and the second voltage level (e.g., $VPASS_R$) to a third access line $202_{X+2}$ adjacent to the first access line $202_{X+1}$ and connected to an erased memory cell $208_{X+2}$ of NAND string $206_0$. At 1008, method 1000 may include sensing a first threshold voltage of the selected memory cell $208_{X+1}$ of NAND string $206_0$.

Figure 10B:
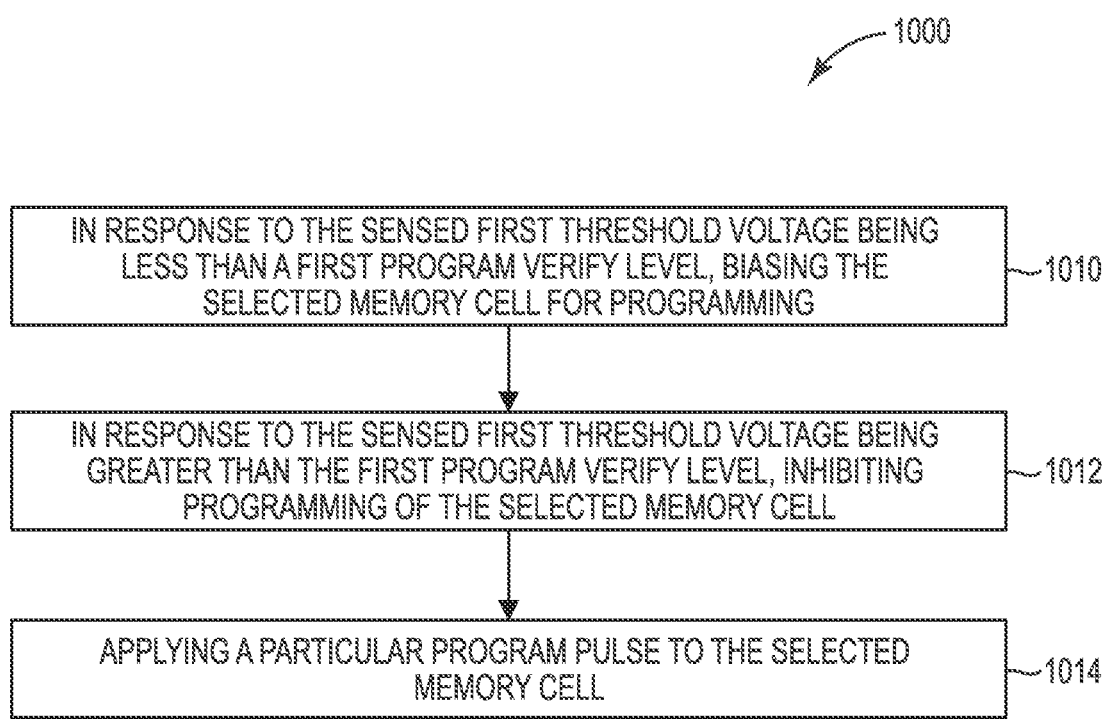

As illustrated in FIG. 10B at 1010, method 1000 may further include in response to the sensed first threshold voltage being less than a first program verify level (e.g., shifted down $PV1_C$), biasing the selected memory cell $208_{X+1}$ of NAND string $206_0$ for programming. At 1012, method 1000 may further include in response to the sensed first threshold voltage being greater than the first program verify level, inhibiting programming of the selected memory cell $208_{X+1}$ of NAND string $206_0$. At 1014, method 1000 may further include applying a particular program pulse to the selected memory cell $208_{X+1}$ of NAND string $206_0$.

Figure 10C:
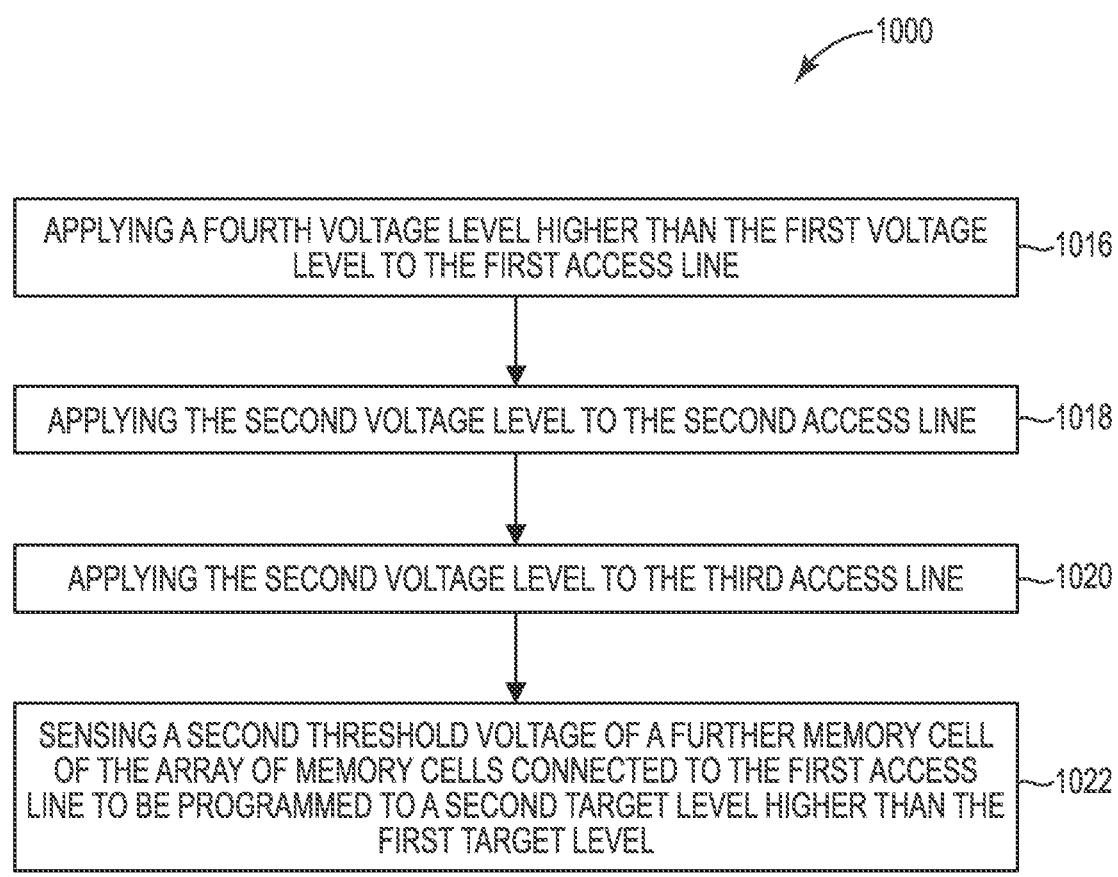

As illustrated in FIG. 10C at 1016, method 1000 may further include applying a fourth voltage level (e.g., $PV2_C$, $PV3_C$, etc.) higher than the first voltage level (e.g., $PV1_C$) to the first access line $202_{X+1}$. At 1018, method 1000 may further include applying the second voltage level (e.g., $VPASS_R$) to the second access line $202_X$. At 1020, method 1000 may further include applying the second voltage level (e.g., $VPASS_R$) to the third access line $202_{X+2}$. At 1022, method 1000 may further include sensing a second threshold voltage of a further memory cell (e.g., $208_{X+1}$ of NAND string $206_2$) of the array of memory cells connected to the first access line $202_{X+1}$ to be programmed to a second target level (e.g., coarse L2, coarse L3, etc.) higher than the first target level (e.g., coarse L1).

Figure 10D:
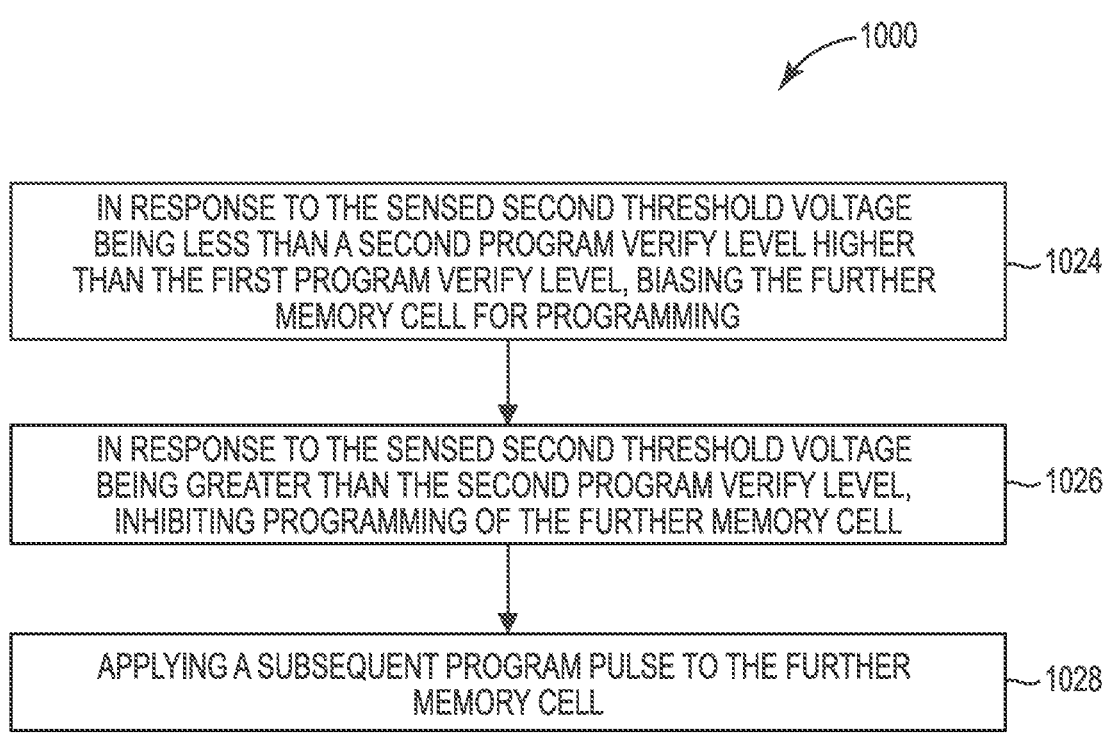

As illustrated in FIG. 10D at 1024, method 1000 may further include in response to the sensed second threshold voltage being less than a second program verify level (e.g., $PV2_C$, $PV3_C$, etc.) higher than the first program verify level (e.g., shifted down $PV1_C$), biasing the further memory cell (e.g., $208_{X+1}$ of NAND string $206_2$) for programming. At 1026, method 1000 may further include in response to the sensed second threshold voltage being greater than the second program verify level, inhibiting programming of the further memory cell (e.g., $208_{X+1}$ of NAND string $206_2$). At 1028, method 1000 may further include applying a subsequent program pulse to the further memory cell (e.g., $208_{X+1}$ of NAND string $206_2$).

CONCLUSION

Although specific embodiments have been illustrated and described herein, it will be appreciated by those of ordinary skill in the art that any arrangement that is calculated to achieve the same purpose may be substituted for the specific embodiments shown. Many adaptations of the embodiments will be apparent to those of ordinary skill in the art. Accordingly, this application is intended to cover any adaptations or variations of the embodiments.

What is claimed is:

1. A memory device comprising:
   an array of memory cells comprising a plurality of strings of series-connected memory cells;
   a plurality of access lines, each access line of the plurality of access lines connected to a control gate of a respective memory cell of each string of series-connected memory cells of the plurality of strings of series-connected memory cells; and
   a controller configured to access the array of memory cells to program a selected memory cell of the array of memory cells to a first target level,
   wherein the controller is further configured to:
     apply a first voltage level to a first access line of the plurality of access lines connected to the selected memory cell;
     apply a second voltage level higher than the first voltage level to a second access line of the plurality of access lines adjacent to the first access line;
     apply a third voltage level between the first voltage level and the second voltage level to a third access line of the plurality of access lines adjacent to the first access line and connected to an erased memory cell; and
     sense a first threshold voltage of the selected memory cell with the first voltage level applied to the first access line, the second voltage level applied to the second access line, and the third voltage level applied to the third access line.

2. The memory device of claim 1, wherein the controller is further configured to access the array of memory cells to program a further memory cell of the array of memory cells connected to the first access line to a second target level higher than the first target level; and
   wherein the controller is further configured to:
     apply a fourth voltage level higher than the first voltage level to the first access line;
     apply the second voltage level to the second access line;
     apply the second voltage level to the third access line; and
     sense a second threshold voltage of the further memory cell.

3. The memory device of claim 1, wherein the controller is further configured to:
    in response to the sensed first threshold voltage being less than a first program verify level, bias the selected memory cell for programming;
    in response to the sensed first threshold voltage being greater than the first program verify level, inhibit programming of the selected memory cell; and
    apply a particular program pulse to the selected memory cell.

4. The memory device of claim 1, wherein the third voltage level is selected such that capacitive coupling between the first access line and the third access line reduces the voltage level on the first access line from the first voltage level.

5. The memory device of claim 1, wherein the first voltage level is less than −1V, the second voltage level is greater than 6V, and the third voltage level is within a range between 1V and 5V.

6. The memory device of claim 3, wherein the controller is further configured to access the array of memory cells to program a further memory cell of the array of memory cells connected to the third access line to the first target level, and
    wherein, with the sensed first threshold voltage greater than the first program verify level, the controller is further configured to:
        apply the first voltage level to the third access line;
        apply the second voltage level to the first access line;
        apply the third voltage level to a fourth access line of the plurality of access lines adjacent to the third access line and connected to an erased memory cell; and
        sense a second threshold voltage of the further memory cell.

7. The memory device of claim 6, wherein the controller is further configured to:
    in response to the sensed second threshold voltage being less than the first program verify level, bias the further memory cell for programming;
    in response to the sensed second threshold voltage being greater than the first program verify level, inhibit programming of the further memory cell; and
    apply a subsequent program pulse to the further memory cell.

8. The memory device of claim 7, wherein, with the sensed second threshold voltage greater than the first program verify level, the controller is further configured to:
    apply a fourth voltage level higher than the first voltage level to the first access line;
    apply the second voltage level to the second access line;
    apply the second voltage level to the third access line; and
    sense a third threshold voltage of the selected memory cell.

9. The memory device of claim 8, wherein the controller is further configured to:
    in response to the sensed third threshold voltage being less than a second program verify level higher than the first program verify level, bias the selected memory cell for programming;
    in response to the sensed third threshold voltage being greater than the second program verify level, inhibit programming of the selected memory cell; and
    apply a further subsequent program pulse to the selected memory cell.

10. The memory device of claim 1, wherein the memory cells comprise Quad-Level Cell (QLC) memory cells.

11. A memory device comprising:
    an array of memory cells comprising a plurality of strings of series-connected memory cells;
    a plurality of access lines, each access line of the plurality of access lines connected to a control gate of a respective memory cell of each string of series-connected memory cells of the plurality of strings of series-connected memory cells; and
    a controller configured to program each respective memory cell connected to a selected first access line of the plurality of access lines to a respective target level, wherein the controller is further configured to:
        apply a first voltage level to the selected first access line;
        apply a second voltage level higher than the first voltage level to a second access line of the plurality of access lines adjacent to the selected first access line;
        apply a third voltage level between the first voltage level and the second voltage level to a third access line of the plurality of access lines adjacent to the selected first access line and connected to respective erased memory cells; and
        sense a first threshold voltage of each respective memory cell connected to the selected first access line with the first voltage level applied to the selected first access line, the second voltage level applied to the second access line, and the third voltage level applied to the third access line.

12. The memory device of claim 11, wherein the controller is further configured to:
    inhibit programming of each respective memory cell connected to the selected first access line in response to the sensed first threshold voltage of the respective memory cell being greater than a first program verify level for the respective memory cell;
    enable programming of each respective memory cell connected to the selected first access line in response to the sensed first threshold voltage of the respective memory cell being less than the first program verify level for the respective memory cell; and
    apply a particular program pulse to the selected first access line.

13. The memory device of claim 12, wherein the first program verify level for each respective memory cell comprises a coarse program verify level less than a fine program verify level for each respective memory cell.

14. The memory device of claim 13, wherein the controller is further configured to:
    apply the second voltage level to the third access line;
    sense a second threshold voltage of each respective memory cell connected to the selected access line;
    inhibit programming of each respective memory cell connected to the selected first access line in response to the sensed second threshold voltage of the respective memory cell being greater than the fine program verify level for the respective memory cell;
    enable programming of each respective memory cell connected to the selected first access line in response to the sensed second threshold voltage of the respective memory cell being less than the final program verify level for the respective memory cell; and
    apply a subsequent program pulse to the selected first access line.

15. The memory device of claim 11, wherein the memory cells comprise Quad-Level Cell (QLC) memory cells.

16. A method for programming an array of memory cells, the method comprising:

applying a first voltage level to a first access line connected to a selected memory cell of the array of memory cells to be programmed to a first target level;

applying a second voltage level higher than the first voltage level to a second access line adjacent to the first access line and connected to an unselected memory cell;

applying a third voltage level between the first voltage level and the second voltage level to a third access line adjacent to the first access line and connected to an erased memory cell; and sensing a first threshold voltage of the selected memory cell with the first voltage level applied to the first access line, the second voltage level applied to the second access line, and the third voltage level applied to the third access line.

17. The method of claim 16, further comprising:

in response to the sensed first threshold voltage being less than a first program verify level, biasing the selected memory cell for programming;

in response to the sensed first threshold voltage being greater than the first program verify level, inhibiting programming of the selected memory cell; and applying a particular program pulse to the selected memory cell.

18. The method of claim 16, further comprising:

applying a fourth voltage level higher than the first voltage level to the first access line;

applying the second voltage level to the second access line;

applying the second voltage level to the third access line; and sensing a second threshold voltage of a further memory cell of the array of memory cells connected to the first access line to be programmed to a second target level higher than the first target level.

19. The method of claim 18, further comprising:

in response to the sensed second threshold voltage being less than a second program verify level higher than the first program verify level, biasing the further memory cell for programming;

in response to the sensed second threshold voltage being greater than the second program verify level, inhibiting programming of the further memory cell; and applying a subsequent program pulse to the further memory cell.

20. The method of claim 16, wherein the memory cells comprise Quad-Level Cell (QLC) memory cells.

* * * * *